US012544787B2

(12) United States Patent
Chen

(10) Patent No.: US 12,544,787 B2
(45) **Date of Patent: *Feb. 10, 2026**

(54) ADJUSTABLE STATIC CLASSIFIER

(71) Applicant: Coperion Process Solutions LLC, Kansas City, MO (US)

(72) Inventor: Michael Chen, Naperville, IL (US)

(73) Assignee: Coperion Process Solutions LLC, Kansas City, MO (US)

( * ) Notice: Subject to any disclaimer, the term of this patent is extended or adjusted under 35 U.S.C. 154(b) by 28 days.

This patent is subject to a terminal disclaimer.

(21) Appl. No.: 18/811,891

(22) Filed: Aug. 22, 2024

(65) Prior Publication Data

US 2025/0018429 A1 Jan. 16, 2025

Related U.S. Application Data

(63) Continuation-in-part of application No. 18/120,094, filed on Mar. 10, 2023, now Pat. No. 12,103,046.

(51) Int. Cl.
*B07B 1/04* (2006.01)
*B07B 11/04* (2006.01)

(52) U.S. Cl.
CPC ................ *B07B 1/04* (2013.01); *B07B 11/04* (2013.01)

(58) Field of Classification Search
CPC .................................. B07B 1/04; B07B 11/04
USPC .......................................................... 209/154
See application file for complete search history.

(56) References Cited

U.S. PATENT DOCUMENTS

| | | | | |
|---|---|---|---|---|
| 2,108,609 | A | 2/1938 | O'Mara | |
| 2,434,037 | A * | 1/1948 | Ebersole .................. | B07B 9/02 241/58 |
| 4,266,673 | A | 5/1981 | Haidlen et al. | |
| 5,957,300 | A | 9/1999 | Nardi et al. | |
| 6,902,126 | B2 | 6/2005 | Chen et al. | |
| 8,136,746 | B2 | 3/2012 | Martin et al. | |
| 8,800,777 | B2 | 8/2014 | Schneider et al. | |
| 8,813,967 | B2 | 8/2014 | Plant et al. | |
| 8,915,373 | B2 | 12/2014 | Lin et al. | |
| 9,981,290 | B2 | 5/2018 | Goosen et al. | |

(Continued)

FOREIGN PATENT DOCUMENTS

| | | |
|---|---|---|
| JP | 50008567 U | 1/1975 |
| JP | 60100072 U | 7/1985 |

(Continued)

OTHER PUBLICATIONS

JP Office Action issued in corresponding JP Application No. 2024-036209, dated Feb. 18, 2025, pp. 1-7.

*Primary Examiner* — Molly K Devine
(74) *Attorney, Agent, or Firm* — Robinson & Cole LLP

(57) ABSTRACT

A static classifier including a vessel having an inlet and an outlet and having a vessel interior area. A classifier chamber is positioned in the vessel interior area. The classifier chamber has a plurality of openings extending through a side wall of the classifier chamber and into a classifier interior area of the classifier chamber. The plurality of openings are configured for passing particles entrained in a gas from the vessel interior area into the classifier interior area. One or more flow restrictors are arranged with the classifier chamber. The flow restrictors are configured to establish an optimal flow velocity and direction of the particles entrained in the gas, through the static classifier.

30 Claims, 25 Drawing Sheets

(56) References Cited

U.S. PATENT DOCUMENTS

| | | | |
|---|---|---|---|
| 10,493,463 B2 | 12/2019 | Bianca et al. | |
| 12,103,046 B1 * | 10/2024 | Chen | B07B 7/086 |
| 2005/0242008 A1 | 11/2005 | Simpson | |
| 2015/0059140 A1 | 3/2015 | Lin et al. | |

FOREIGN PATENT DOCUMENTS

| | | | |
|---|---|---|---|
| JP | 62151987 | U | 9/1987 |
| JP | 2013233544 | A | 11/2013 |
| JP | 2021130075 | A | 9/2021 |

* cited by examiner

ADJUSTABLE STATIC CLASSIFIER

CROSS REFERENCE TO RELATED APPLICATIONS

This application is a Continuation in Part of and claims priority to U.S. patent application Ser. No. 18/120,094 entitled "Adjustable Static Classifier", filed Mar. 10, 2023, now U.S. Pat. No. 12,103,046 B1, issued Oct. 1, 2024, the entirety of which is incorporated herein by reference.

TECHNICAL FIELD

The present invention is directed to a static classifier for a grinding mill system or an in-stream classification system without the mill, the static classifier being configured for separating ground or pulverized particles of different sizes and having multiple flow restrictor means for adjusting the flow velocity and direction of particles entrained in a gas therethrough to maintain a steep particle separation.

BACKGROUND

Grinding mills are used to crush and pulverize solid materials such as minerals, limestone, gypsum that is used in the production of stucco, phosphate rock, salt, biomass, coke, and coal into small particles. Impact hammer mill and ball race mills are typical grinding mills that can be used to crush, pulverize, dry and flash calcining certain kind of solid materials such as gypsum all in one step. Ground particles of various sizes are discharged from the grinding mills into a downstream classifier. One prior art classifier is known as a "whizzer separator" as disclosed in U.S. Pat. No. 2,108,609. Another classifier is a turbine classifier. One of the prior art classifiers may be employed for the classification of the fine particles.

The efficiency of a classifier depends upon the air flow through the classifier and the type of material being classified. Prior art static classifiers are limited to a specific air flow and velocity of the air based upon the physical structure of the classifier. Thus, different classifiers are typically used for classifying different materials and a single classifier cannot be employed for classifying a wide range of different materials, for example natural gypsum and synthetic gypsum (FGD). To produce the same amount of stucco for wall board production, calcining FGD requires much more airflow than calcining natural gypsum due to higher moisture level in the feed. Over the last 10 years, the gypsum source has been changing greatly due to coal fired power plant being shut down in western countries. At the same time, in the developing countries, the coal fired power plants are still being built and more FGD feed will be available in the future. Therefore, an ideal new calcining system needs to be able to handle wide variation of feed type and airflow rate.

Thus, there is a need for an improved classifier that addresses the foregoing problems.

SUMMARY

There is disclosed herein, a static classifier that includes a vessel that has an inlet and an outlet and has a vessel interior area. The static classifier includes a classifier chamber that is positioned in the vessel interior area. The classifier chamber has a plurality of openings extending through a side wall of the classifier chamber and into a classifier interior area of the classifier chamber. The plurality of openings are each configured for passing particles entrained in a gas from the vessel interior area into the classifier interior area. The static classifier includes one or more flow restrictors arranged with the classifier chamber. The one flow restrictor is configured to establish a flow velocity of the particles entrained in the gas, through the static classifier. Each of the plurality of openings has an axial extent. The classifier chamber includes a classifier outlet connected to an outlet duct. The flow restrictor includes a sleeve moveably positioned in the outlet duct and a distal end of the sleeve extends into the classifier interior area and partially eclipses the axial extent.

In certain embodiments, the static classifier includes an actuator system that is in communication with the sleeve. The actuator system is configured to axially position the sleeve relative to the plurality of openings.

In certain embodiments, the actuator system is mounted to an outer portion of the outlet duct and a portion of the actuator system extends through a slot in the outlet duct and is secured to the sleeve.

In certain embodiments, the static classifier includes a first seal that has a portion thereof radially positioned between the sleeve and the outlet duct and axially located below the slot and a second seal that has a portion thereof radially positioned between the sleeve and the outlet duct and axially located above the slot.

In certain embodiments, the actuator system is a rack and pinion device.

In certain embodiments, the actuator system includes a first actuator positioned on a first side of the duct and a second actuator positioned on a second side of the duct. The first actuator and the second actuator are synchronously coupled to axially move the sleeve.

In certain embodiments, the first actuator is a first screw jack and the second actuator is a second screw jack. The synchronously coupling system includes: (i) a driver gear box coupled to the first screw jack via a first linkage; (ii) a driven gear box coupled to the second screw jack via a second linkage; and (iii) a third linkage coupling the driver gear box to the driven gear box.

In certain embodiments, the first actuator is a first linear actuator and the second actuator is a second linear actuator. The first linear actuator and the second linear actuator are synchronously coupled via an electronic system.

In certain embodiments, a second flow restrictor the static classifier includes a vane pivotally arranged to the side wall of the classifier chamber proximate each of the plurality of openings.

In certain embodiments, each of the plurality of openings has an axial extent and a circumferential extent and the vane has an axial length about equal to the axial extent. The vane has a circumferential arc-length that is about equal to the circumferential extent.

In certain embodiments, there is vane-actuator system in communication with the vanes.

In certain embodiments, the classifier chamber has a top-plate secured thereto. Each of the vanes is pivotally mounted on a shaft which extends through the top-plate. The vane-actuator system includes a linkage system connected to each of the shafts and a vane actuator connected to the linkage system. The vane actuator is configured to synchronously pivot the vanes relative to the side wall of the classifier chamber.

In certain embodiments, the vane actuator includes a lever for manual operation or a motor for electric powered operation of the vane actuator.

There is disclosed herein a static classifier that includes a vessel that has an inlet and an outlet and has a vessel interior area. The static classifier includes a classifier chamber positioned in the vessel interior area. The classifier chamber has a plurality of openings that extend through a side wall of the classifier chamber and into a classifier interior area of the classifier chamber. The plurality of openings are configured for passing particles entrained in a gas from the vessel interior area into the classifier interior area. The static classifier includes a first flow restrictor and a second flow restrictor each which are arranged with the classifier chamber. The first flow restrictor and the second flow restrictor each are configured to establish a flow velocity and direction of the particles entrained in the gas, through the static classifier. The first flow restrictor includes one or more vanes that are pivotally arranged to the side wall of the classifier chamber, proximate each of the plurality of openings. The second flow restrictor includes one or more covers each of which are removably secured over one or more of the plurality of openings.

In certain embodiments, each of the plurality of openings has an axial extent and a circumferential extent. A respective one of the covers extends across the circumferential extent and partially across the axial extent of one or more of the plurality of openings.

In certain embodiments, each of the plurality of openings has an axial extent and a circumferential extent. Each of the vanes has an axial length that is about equal to the axial extent and has a circumferential arc-length that is about equal to the circumferential extent.

In certain embodiments, the static classifier includes a vane-actuator system that is in communication with the vanes.

In certain embodiments, the classifier chamber has a top-plate secured thereto. Each of the vanes is pivotally mounted on a shaft which extends through the top-plate. The vane-actuator system includes a linkage system that is connected to each of the shafts. A vane actuator is connected to the linkage system. The vane actuator is configured to synchronously pivot the vanes relative to the side wall of the classifier chamber.

In certain embodiments, the vane actuator includes a lever for manual operation or a motor for electric powered operation of the vane actuator.

In certain embodiments, each of the plurality of openings has an axial extent. The classifier chamber includes a classifier outlet that is connected to an outlet duct. The static classifier further includes a third flow restrictor that is configured as a sleeve that is moveably positioned in the outlet duct and a distal end of the sleeve extends into the classifier interior area and partially eclipses the axial extent.

In certain embodiments, an actuator system is in communication with the sleeve. The actuator system is configured to axially position the sleeve relative to the plurality of openings.

In certain embodiments, the actuator system is mounted to an outer portion of the outlet duct and a portion (e.g., an arm) of the actuator system extends through a slot in the outlet duct and is secured to the sleeve.

In certain embodiments, a first seal has a portion thereof radially positioned between the sleeve and the outlet duct and is axially located below the slot and a second seal has a portion thereof radially positioned between the sleeve and the outlet duct and is axially located above the slot.

In certain embodiments, the actuator system is a rack and pinion device.

In certain embodiments, the actuator system includes a first actuator positioned on a first side of the duct and a second actuator positioned on a second side of the duct. The first actuator and the second actuator are synchronously coupled to axially move the sleeve.

In certain embodiments, the first actuator is a first screw jack and the second actuator is a second screw jack. The synchronously coupling system includes: (i) a driver gear box that is coupled to the first screw jack via a first linkage; (ii) a driven gear box coupled to the second screw jack via a second linkage; and (iii) a third linkage coupling the driver gear box to the driven gear box.

In certain embodiments, the first actuator includes a first linear actuator and the second actuator includes a second linear actuator. The first linear actuator and the second linear actuator are synchronously coupled via an electronic system.

There is disclosed herein a static classifier including a vessel having an inlet and an outlet and having a vessel interior area. A classifier chamber is positioned in the vessel interior area. The classifier chamber has a plurality of openings extending through a side wall of the classifier chamber and into a classifier interior area of the classifier chamber. The plurality of openings are configured for passing particles entrained in a gas from the vessel interior area into the classifier interior area. At least one flow restrictor is arranged with the classifier chamber. The at least one flow restrictor is configured to establish a flow velocity and direction of the particles entrained in the gas, inside the static classifier.

In certain embodiments, the at least one flow restrictor includes a cover removably secured over a respective one of the plurality of openings. In some embodiments, each of the plurality openings has a cover secured thereover.

In certain embodiments, each of the plurality of openings has an axial extent and a circumferential extent and each of the at least one covers extends across the circumferential extent and partially across the axial extent.

In certain embodiments, each of the plurality of openings has an axial extent and the classifier chamber includes a classifier outlet connected to an outlet duct. The at least one flow restrictor comprises a sleeve moveably positioned in the outlet duct and a distal end of the sleeve extends into the classifier interior area and partially eclipses the axial extent.

In certain embodiments, a single actuator system is in communication with the sleeve, and the actuator system is configured to axially position the sleeve relative to the plurality of openings. In certain embodiments, two or more actuator systems (e.g., four actuators) are in communication with the sleeve, and the actuator systems are configured to axially position the sleeve relative to the plurality of openings.

In certain embodiments, the actuator system is mounted to an outer portion of the outlet duct and a portion of the actuator system extends through a slot in the outlet duct and is secured to the sleeve.

In certain embodiments, the static classifier includes a first seal having a portion thereof radially positioned between the sleeve and the outlet duct and axially located below the slot, and a second seal having a portion thereof radially positioned between the sleeve and the outlet duct and axially located above the slot.

In certain embodiments, the actuator system includes a single rack and pinion device. In certain embodiments, the actuator system includes two or more rack and pinion devices.

In certain embodiments, the actuator system includes a first actuator positioned on a first side of the duct and a second actuator positioned on a second side of the duct. The first actuator and the second actuator are synchronously coupled to axially move the sleeve.

In certain embodiments, the first actuator includes a first screw jack and the second actuator includes a second screw jack. The synchronously coupling includes: (i) a driver gear box coupled to the first screw jack via a first linkage; (ii) a driven gear box coupled to the second screw jack via a second linkage; and (iii) a third linkage coupling the driver gear box to the driven gear box.

In certain embodiments, the first actuator includes a first linear actuator and the second actuator comprises a second linear actuator. The first linear actuator and the second linear actuator are synchronously coupled and the synchronously coupling is electronic.

In certain embodiments, the at least one flow restrictor comprises a vane pivotally arranged to the side wall of the classifier chamber proximate each of the plurality of openings.

In certain embodiments, each of the plurality of openings has an axial extent and a circumferential extent and wherein the vane has an axial length about equal to the axial extent and a circumferential arc-length about equal to the circumferential extent.

In certain embodiments, the static classifier includes a vane-actuator system in communication with the vanes.

In certain embodiments, the classifier chamber has a top-plate secured thereto, each of the vanes being pivotally mounted on a shaft which extends through the top-plate. The vane-actuator system includes a linkage system connected to each of the shafts and a vane actuator connected to the linkage system. The vane actuator is configured to synchronously pivot the vanes relative to the side wall of the classifier chamber.

In certain embodiments, the vane actuator includes a motor.

In certain embodiments, the sleeve has an outside diameter and an outer edge of the vanes defines a reference circle (R) which has a reference diameter when the vanes extended to a maximum radially inward position. The outside diameter is less than the reference diameter so that the distal end of the sleeve is spaced apart from the vanes when the sleeve extends into the classifier interior area and partially eclipses the axial extent.

In certain embodiments, the sleeve has an outside diameter and an outer edge of the vanes define a reference circle which has a reference diameter when the vanes extend to a maximum radially inward position. The outside diameter is less than the reference diameter so that the distal end of the sleeve is spaced apart from the vanes when the sleeve extends into the classifier interior area and partially eclipses the axial extent.

In certain embodiments, three flow restrictors are employed including the covers, the sleeve, and the vanes.

In certain embodiments, only two flow restrictors are employed, namely, the sleeve and the vanes.

In certain embodiments, only two flow restrictors are employed, namely, the covers and the vanes.

There is disclosed herein a static classifier that includes a vessel that has an inlet, a vessel outlet and a vessel interior area. The vessel has a top-plate positioned on the vessel outlet and has a classifier outlet formed in the top-plate. An outlet duct is positioned on the classifier outlet and at least an outer-duct portion of the outlet duct extends outwardly from the top-plate. The outer-duct portion includes a lower outer-duct portion, an upper outer-duct portion and a removable outer-duct portion positioned between and removably connected to the lower outer-duct portion and the upper outer-duct portion. The lower outer-duct portion has a first axial length and the removable outer-duct portion has a second axial length. A classifier chamber is positioned in the vessel interior area and has a plurality of openings extending through a side wall of the classifier chamber and into a classifier interior area of the classifier chamber. The plurality of openings is configured for passing particles entrained in a gas from the vessel interior area into the classifier interior area. The static classifier includes one or more flow restrictors arranged with the classifier chamber. The flow restrictor is configured to establish a flow velocity and direction of the particles entrained in the gas, through the static classifier. The flow restrictor is a sleeve that has an upper sleeve end, a lower sleeve end and a third axial length that extends between the upper sleeve end and the lower sleeve end. The upper sleeve end is removably secured and in fixed relation to (i.e., fixed in position, not moveable and not repositionable when the static classifier is assembled and during operation of the static classifier) between the lower outer-duct portion and the removable outer-duct portion. Each of the plurality of openings has an axial extent that extends between an upper edge of the opening and a lower edge of the opening. The lower edge of the axial extent is located at a fourth axial length measured downward from the top plate. The lower sleeve end extends downwardly over at least a portion of the axial extent.

In some embodiments, the third axial length is a maximum third axial length such that the lower sleeve end extends downwardly over the axial extent and the lower edge of the opening.

In some embodiments, the second axial length is greater than the maximum third axial length, such that second axial length provides an axial clearance for removal of the sleeve between the lower outer-duct portion and the upper outer-duct portion, when the removable outer-duct portion is removed.

In some embodiments, the maximum third axial length is greater than or equal to the sum of the first axial length and the fourth axial length.

In some embodiments, the second axial length is greater than or equal to the sum of the first axial length and the fourth axial length.

In some embodiments, the third axial length is of a magnitude of one of: (a) a first magnitude or a second magnitude that is greater that the first magnitude; (b) equal to the sum of the first axial length and one half of the fourth axial length; and (c) greater than the first axial length and up to and including the sum of the first axial length and the fourth axial length.

In some embodiments, the sleeve has an outside sleeve diameter and the lower outer-duct portion has an inside duct diameter that is greater than the outside sleeve diameter such that there is a radial gap between an outer sleeve surface of the sleeve and an inner duct surface of the lower outer-duct portion, to accommodate removal of the sleeve from the lower outer-duct portion.

In some embodiments, there are one or more first grips secured to a radially outer surface of the removable outer-duct portion to facilitate removal of the removable outer-duct portion.

In some embodiments, there is one or more receptacles (e.g., a threaded hole) formed in the flange of the sleeve for receiving a second grip to facilitate removal of the sleeve.

In some embodiments, the first axial length is greater than a height of a structure (e.g., portions of a vane actuator assembly excluding the vane actuator) mounted on and extending axially upward from the top plate, to accommodate removal of the sleeve from the lower outer-duct portion.

There is further disclosed herein a method for selectively modifying performance of a static classifier. The method includes providing the static classifier that includes a vessel that has an inlet, a vessel outlet and a vessel interior area. The vessel has a top-plate positioned on the vessel outlet and has a classifier outlet formed in the top-plate. An outlet duct is positioned on the classifier outlet and at least an outer-duct portion of the outlet duct extends outwardly from the top-plate. The outer-duct portion includes a lower outer-duct portion, an upper outer-duct portion and a removable outer-duct portion positioned between and removably connected to the lower outer-duct portion and the upper outer-duct portion. The lower outer-duct portion has a first axial length and the removable outer-duct portion has a second axial length. A classifier chamber is positioned in the vessel interior area and has a plurality of openings extending through a side wall of the classifier chamber and into a classifier interior area of the classifier chamber. The plurality of openings is configured for passing particles entrained in a gas from the vessel interior area into the classifier interior area. The static classifier has a flow restrictor arranged with the classifier chamber. The flow restrictor is configured to establish a flow velocity of the particles entrained in the gas, through the static classifier. The flow restrictor is a sleeve that has an upper sleeve end, a lower sleeve end and a third axial length that extends between the upper sleeve end and the lower sleeve end. The upper sleeve end is removably secured (i.e., fixed in position, not moveable and not repositionable when the static classifier is assembled during operation of the static classifier) between the lower outer-duct portion and the removable outer-duct portion. Each of the plurality of openings has an axial extent that extends between an upper edge of the opening and a lower edge of the opening. The lower edge of the axial extent is located at a fourth axial length measured downward from the top plate. The lower sleeve end extends downwardly over at least a portion of the axial extent. The sleeve has the third axial length that is one of a first magnitude or a second magnitude that is greater than the first magnitude. The method includes removing the removable outer-duct portion thereby creating a space between the lower outer-duct portion and the upper outer-duct portion. The sleeve is raised vertically out of the lower outer-duct portion and into the space. The sleeve is moved horizontally out of the space. The method includes selecting a replacement version of the sleeve, which has the third axial length being another of the first magnitude or the second magnitude. The replacement version of the sleeve is moved horizontally into the space. The replacement version of the sleeve is lowered vertically downward into the lower outer-duct portion. The method includes replacing the removable outer-duct portion into position between the upper outer-duct portion and the lower outer-duct portion.

In some embodiments, a second flow restrictor that is a vane is pivotally arranged to and located radially inward of the side wall of the classifier chamber proximate each of the plurality of openings. The vane is positioned radially outward of and axially aligned with a portion of the sleeve that partially eclipses the axial extent, and is located between the sleeve and the side wall.

In some embodiments, each of the plurality of openings has a circumferential extent and the vane has an axial length equal to the axial extent and a circumferential arc-length equal to the circumferential extent.

In some embodiments, a vane-actuator system is in communication with the vanes.

In some embodiments, each of the vanes are pivotally mounted on a shaft which extends through the top-plate. The vane-actuator system includes a linkage system connected to each of the shafts and a vane actuator are connected to the linkage system. The vane actuator is configured to synchronously pivot the vanes relative to the side wall of the classifier chamber.

In some embodiments, the vane actuator includes a lever for manual operation or a motor for electric powered operation of the vanes.

In some embodiments, a second flow restrictor includes one or more covers that are each removably secured over a respective one of the plurality of openings. The covers are located in the vessel interior area.

In some embodiments, each of the plurality of openings has a circumferential extent and a respective one of the covers extends across the circumferential extent and partially across the axial extent of a respective one of the plurality of openings.

In some embodiments, a third flow restrictor is provided in addition to the vanes and the third flow restrictors are one or more covers removably secured over a respective one of the plurality of openings. The covers are located in the vessel interior area. In some embodiments, each of the plurality of openings has a circumferential extent and a respective one of the covers extends across the circumferential extent and partially across the axial extent of a respective one of the plurality of openings.

There is further disclosed herein static classifier that includes a vessel that has an inlet and a vessel outlet and that has a vessel interior area. The vessel has a top-plate that is positioned on the vessel outlet and has a classifier outlet is formed in the top-plate. An outlet duct is positioned on the classifier outlet and at least an outer-duct portion of the outlet duct extends outwardly from the top-plate. The outer-duct portion includes a lower outer-duct portion, an upper outer-duct portion, and a removable outer-duct portion positioned between and removably connected to the lower outer-duct portion and the upper outer-duct portion. The lower outer-duct portion has a first axial length and the removable outer-duct portion has a second axial length. A classifier chamber is positioned in the vessel interior area. The classifier chamber has a plurality of openings that extend through a side wall of the classifier chamber and into a classifier interior area of the classifier chamber. The plurality of openings are configured for passing particles entrained in a gas from the vessel interior area into the classifier interior area. Each of the plurality of openings has an axial extent that extends between an upper edge of the opening and a lower edge of the opening. The lower edge of the axial extent is located at a fourth axial length measured downward from the top plate. The static separator includes a flow restrictor kit that includes: (a) a first sleeve that has a first upper sleeve end, a first lower sleeve end and a first sleeve third axial length that extends between the first upper sleeve end and the first lower sleeve end; and (b) a second sleeve that has a second upper sleeve end, a second lower sleeve end and a second sleeve third axial length that extends between the second upper sleeve end and the second lower sleeve end. The second sleeve third axial length is greater than the first sleeve third axial length. The first sleeve and the second sleeve are individually changeably (e.g., interchangeably, selectively changeably or configurable) positionable in the classifier chamber. Thus, the first sleeve and the second sleeve have different third axial lengths that depend on the type of material processed through the static classifier and the application (e.g., gypsum calcining and gypsum impurity removal) and the extent to which the openings need to be covered.

DETAILED DESCRIPTION

Figure 1:
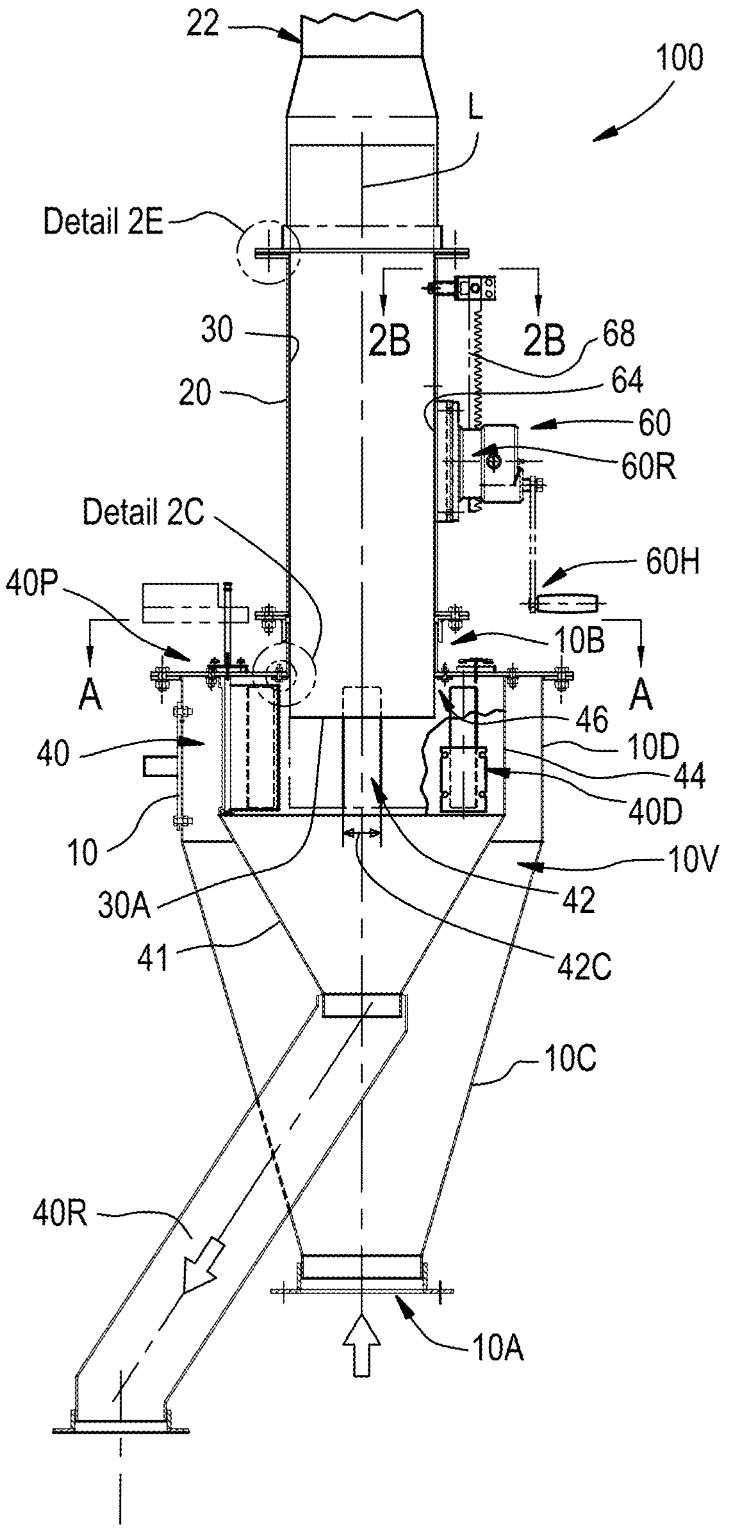
FIG. 1 is a cross sectional view of the static classifier of the present invention using a single actuator for the sleeve movement.

As shown in FIG. 1, a static classifier of the present invention is generally designated by the numeral 100. The static classifier 100 includes a vessel 10 that has an inlet 10A and a vessel outlet 10B and has a vessel interior area 10V. The vessel 10 includes an upper drum 10D that transitions into a lower cone 10C that tapers inwardly to the inlet 10A.

The static classifier 100 includes a classifier chamber 40 (e.g., an outlet sleeve) positioned in the vessel interior area 10V inside the upper drum 10D. The classifier chamber 40 has a plurality of openings 42 (e.g., windows) that extend through a side wall 44 of the classifier chamber 40 and into a classifier interior area 40D of the classifier chamber 40. The plurality of openings 42 are configured for passing particles entrained in a gas from the vessel interior area 10V into the classifier interior area 40D.

The static classifier 100 includes one or more flow restrictors arranged with the classifier chamber 40, as described further herein. Each of the flow restrictors are configured to establish a flow velocity and or direction of the particles entrained in the gas through the static classifier 100. The number and type of flow restrictors used depends upon the required particle size and the system air flow.

The static classifier 100 of the present invention has utility in being able to separate large particles from the small ones. The flow restrictors help optimize the classification efficiency and maintain the efficiency when system flow rate changes significantly due to process requirements change.

The upper drum 10D of the classifier chamber 40 has a top-plate 40P secured thereto. The classifier chamber 40 has a classifier outlet 46 formed in the top-plate 40P. The classifier outlet 46 is connected to an outlet duct 20 (e.g., an uptake duct) through which fine classified particles entrained in the gas flow and discharged therefrom via a duct outlet 22.

Figure 6:
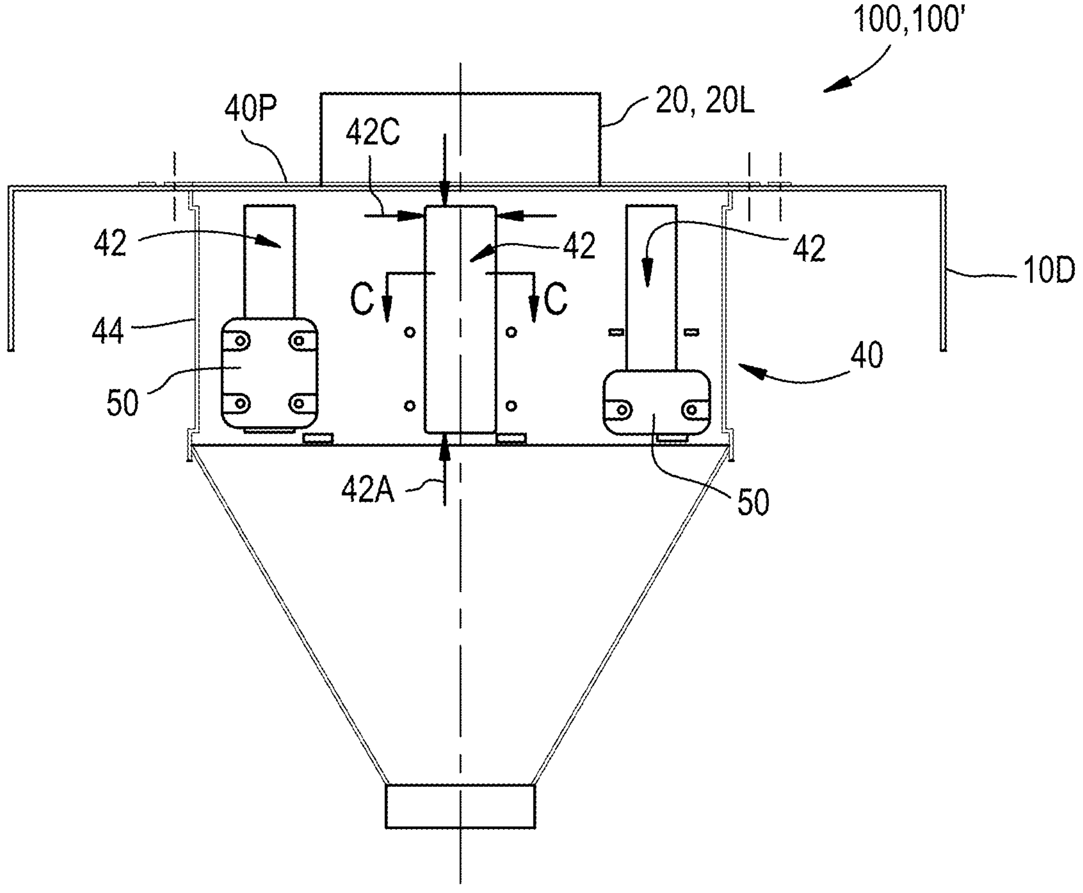
FIG. 6 is a front view of a portion of the static classifier of FIGS. 1 and 14A, shown with two covers positioned over openings in the classifier chamber.
Figure 7:
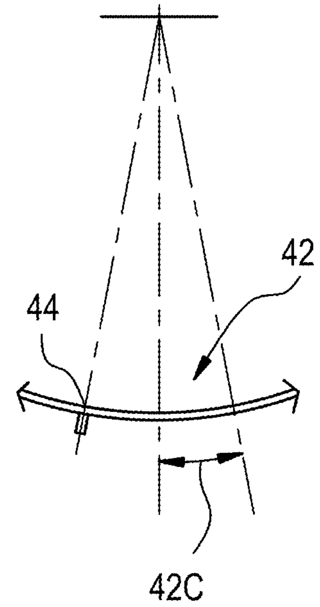
FIG. 7 is a top sectional view of the opening in the classifier chamber taken across section C-C of FIG. 6.
Figure 8A:
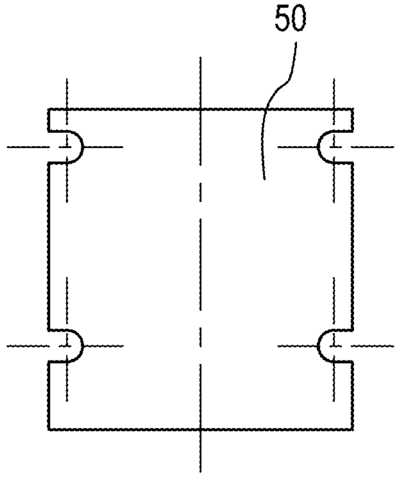
FIG. 8A is a front view of a large cover shown in FIG. 6.
Figure 8B:
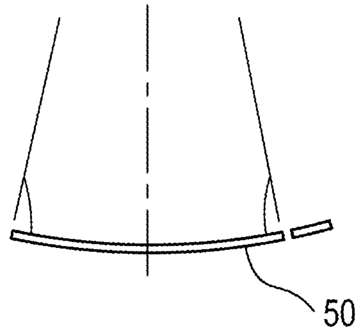
FIG. 8B is a top sectional view of the cover of FIG. 8A.
Figure 9A:
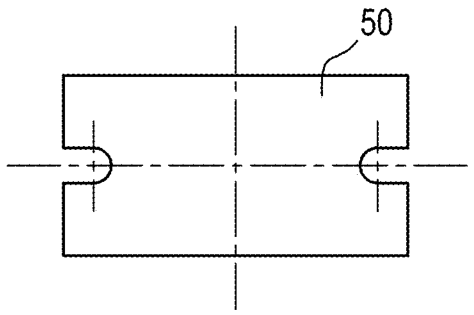
FIG. 9A is afront view of a small cover shown in FIG. 6.
Figure 9B:
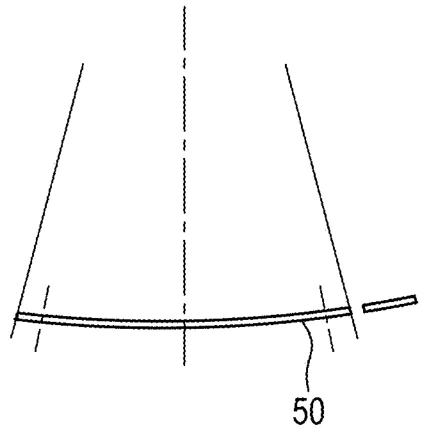
FIG. 9B is a top sectional view of the cover of FIG. 9A.

As shown in the embodiment of FIG. 6, the flow restrictors are in the form of covers 50 that are removably secured (e.g., bolted to) to the side wall 44 of the classifier chamber 40 and are positioned over a portion of two of the plurality of openings 42. Each of the plurality of openings 42 has an axial extent 42A and a circumferential extent 42C. Each of the covers 50 extends across the circumferential extent 42C and partially across the axial extent 42A. For example, one of the covers 50 (the one on the left-hand side of FIG. 6) extends across a greater percentage of the axial extent than does the other cover 50 (the one on the right-hand side of FIG. 6). While only two covers 50 are shown positioned over a respective one of the openings 42, the present invention is not limited in this regard as the cover 50 can be bigger or smaller than shown here depending on the flow velocity and particle separation size required and each of the openings 42 may have a cover 50 secured thereto. In some embodiments, the cover 50 extends across two or more of the openings 42 or all of the openings.

Figure 2A:
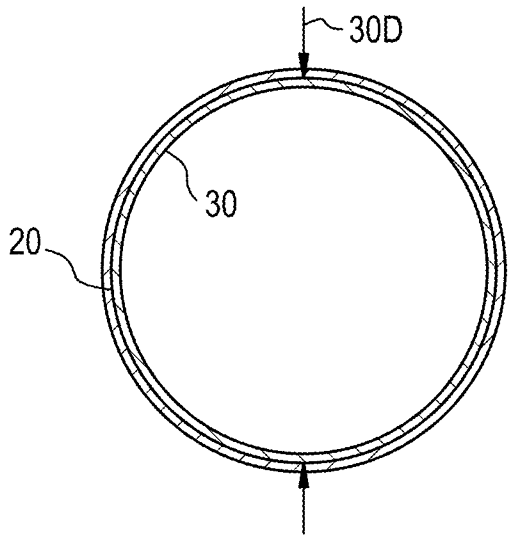
FIG. 2A is a top sectional view of the static classifier of FIG. 1 taken across section A-A.
Figure 2B:
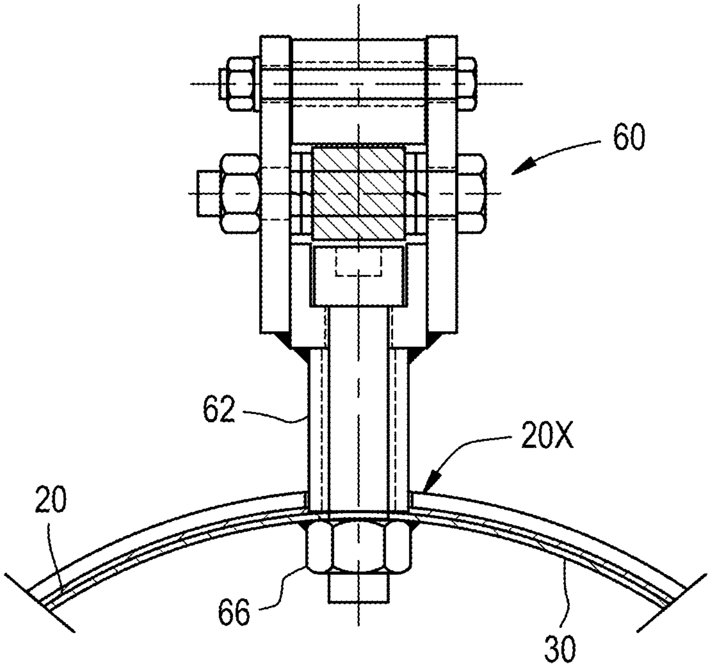
FIG. 2B is a top sectional view of the static classifier of FIG. 1 taken across section B-B.

As shown in the embodiment of FIGS. 1, 2A, and 2B a flow restrictor is in the form of a sleeve 30 that is axially (along longitudinal axis L) moveably positioned in the outlet duct 20 and a distal end 30A of the sleeve 30 extends into the classifier interior area 40D and partially eclipses an upper portion of the axial extent 42A of the openings 42. An actuator system 60 is in communication with the sleeve (30), for example a portion of the actuation system is bolted to the sleeve 30 with a suitable fastener 66. The actuator system 60 is configured to axially position the sleeve 30 relative to the plurality of openings 42. The actuator system 60 is mounted to an outer portion of the outlet duct 20 with a suitable fastening system 64. and a portion (e.g., actuator arm 62) of the actuator system 60 extends through a longitudinal slot 20X in the outlet duct 20 and is secured to the sleeve 30, as shown in FIG. 2B. In the embodiment shown in FIGS. 1 and 2B, the actuator system 60 is a rack and pinion device 60R with a rack 68 and a hand crank 60H.

Figure 2C:
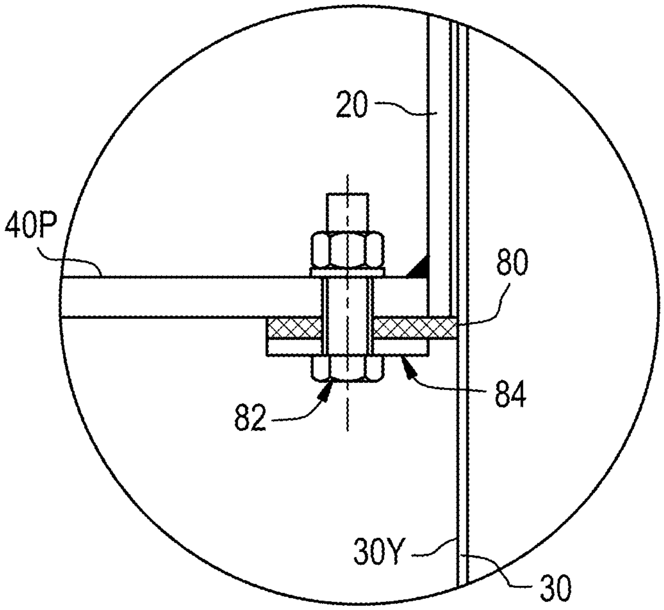
FIG. 2C is an enlarged sectional view of Detail 2C of FIG. 1, of the lower seal.
Figure 2D:
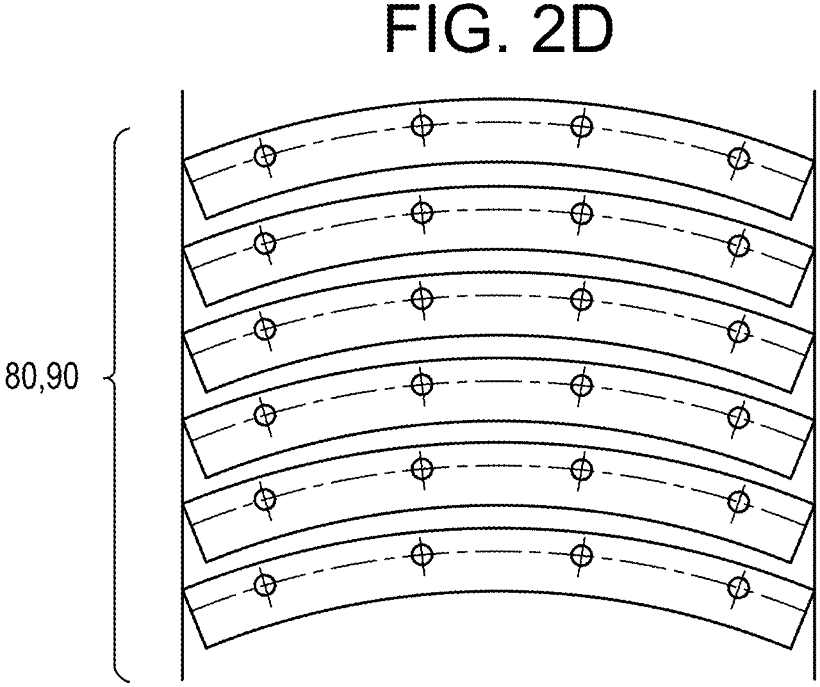
FIG. 2D is a top view of a segmented seal for use in the static classifier of FIGS. 11 and 12.

As shown in FIG. 2C, a first seal 80 has a portion thereof radially positioned between the sleeve 30 and the outlet duct 20 and axially located below the slot 20X. The first seal 80 is secured to the top plate 40P, inside the upper drum 10D, by a plurality of fasteners 82 and a washer system 84. The first seal 80 projects radially inward from the top plate 40P and sealingly engages an outside surface 30Y of the sleeve 30 as the outside surface 30Y slidingly engages the seal 80. In some embodiments, the first seal 80 is segmented and has multiple pieces as shown in FIG. 2D. In some embodiments, the second seal 80 is a complete circular piece as shown in FIG. 2F. In some embodiments, the first seal is high temperature resistant gasket material such as graphite, a silicone or fluoroelastomer (e.g., Viton®) material.

Figure 2E:
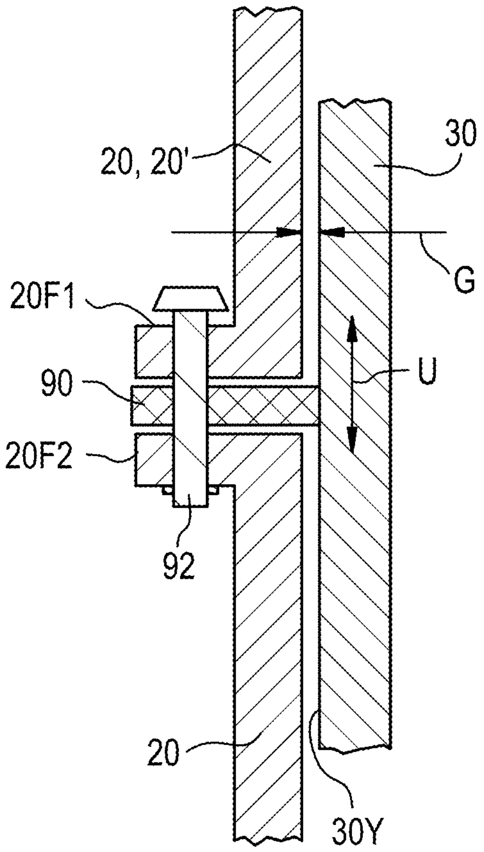
FIG. 2E is an enlarged sectional view of Detail 2E of FIG. 1 of the upper seal and of the upper and lower seal of FIG. 2G.
Figure 2F:
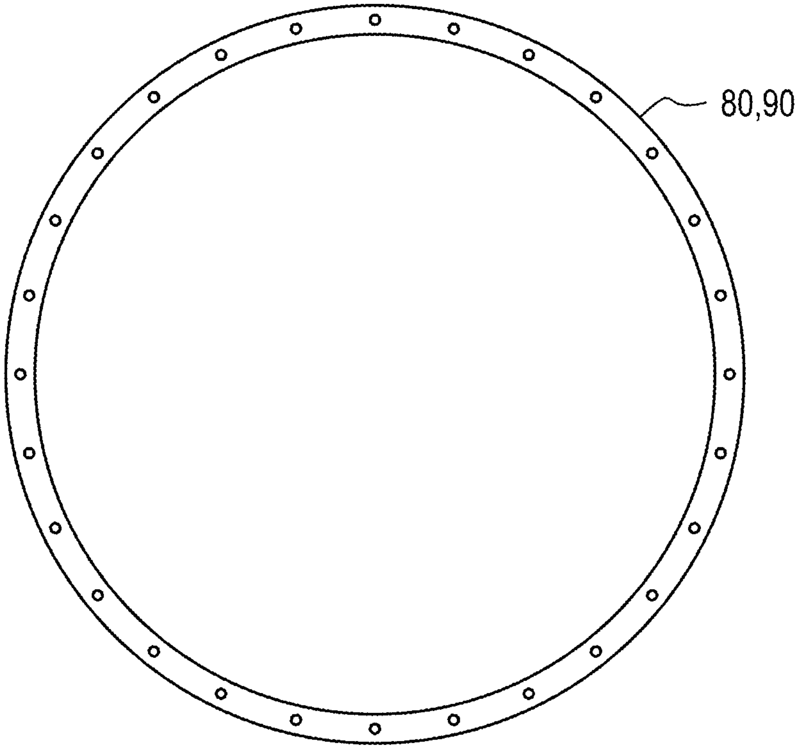
FIG. 2F is a top view of a complete circular seal for use in the upper and/or lower seal configurations of Detail 2E of FIG. 1 and Detail 2C of FIG. 1.

As shown in FIG. 2E, a second seal 90 has a portion thereof radially positioned between the sleeve 30 and the outlet duct 20 and axially located above the slot 20X. The outlet duct 20 has a first flange 20F1 and a second flange 20F2 with the second seal 90 secured therebetween by a plurality of fasteners 92. A portion of the seal 90 (stationary seal) projects radially inward from the outlet duct 20 and sealing engages the outside surface 30Y of the sleeve 30 as the outside surface slidingly engages the seal 90. In some embodiments, the second seal 90 is segmented and has multiple pieces as shown in FIG. 2D. In some embodiments, the second seal 90 is a complete circular piece. In some embodiments, the first seal is high temperature resistant gasket material such as graphite, a silicone or fluoroelastomer (e.g., Viton®) material. The seals 80, 90 have utility in preventing leakage of the ambient airflow from entering into the gas through the slot 20X when the system is operating under a negative pressure. The seals 80, 90 also prevents the process particle flow leaking out to the ambient if the system is operating under positive pressure.

Figure 2G:
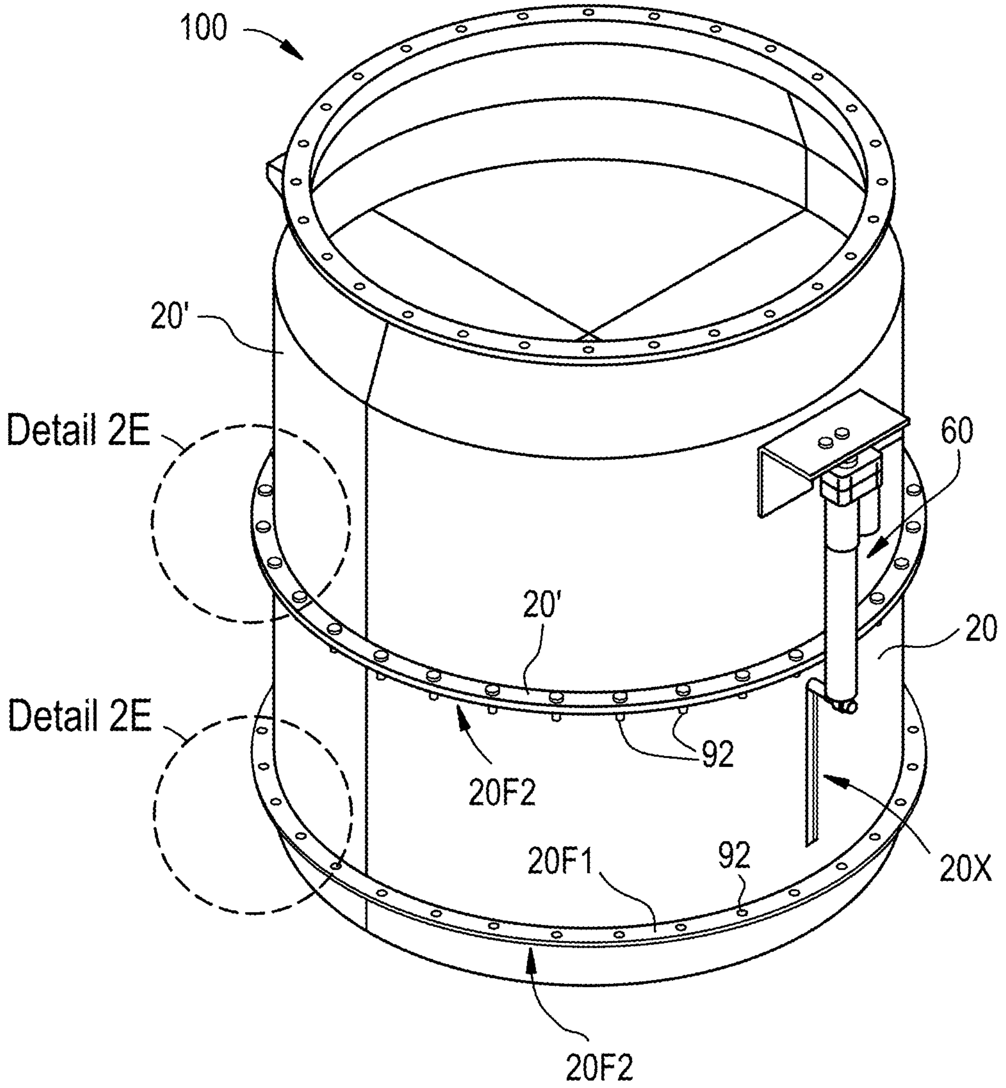
FIG. 2G is a perspective view of another embodiment of a multi-piece outlet duct with a slot extending therethrough.

In some embodiments, the seal 80 is eliminated and replaced with the seal 90 and flanges 20F1, 20F2 shown in FIG. 2C on a multi-piece outlet duct, 20, 20', as shown in FIG. 2G.

Figure 11A:
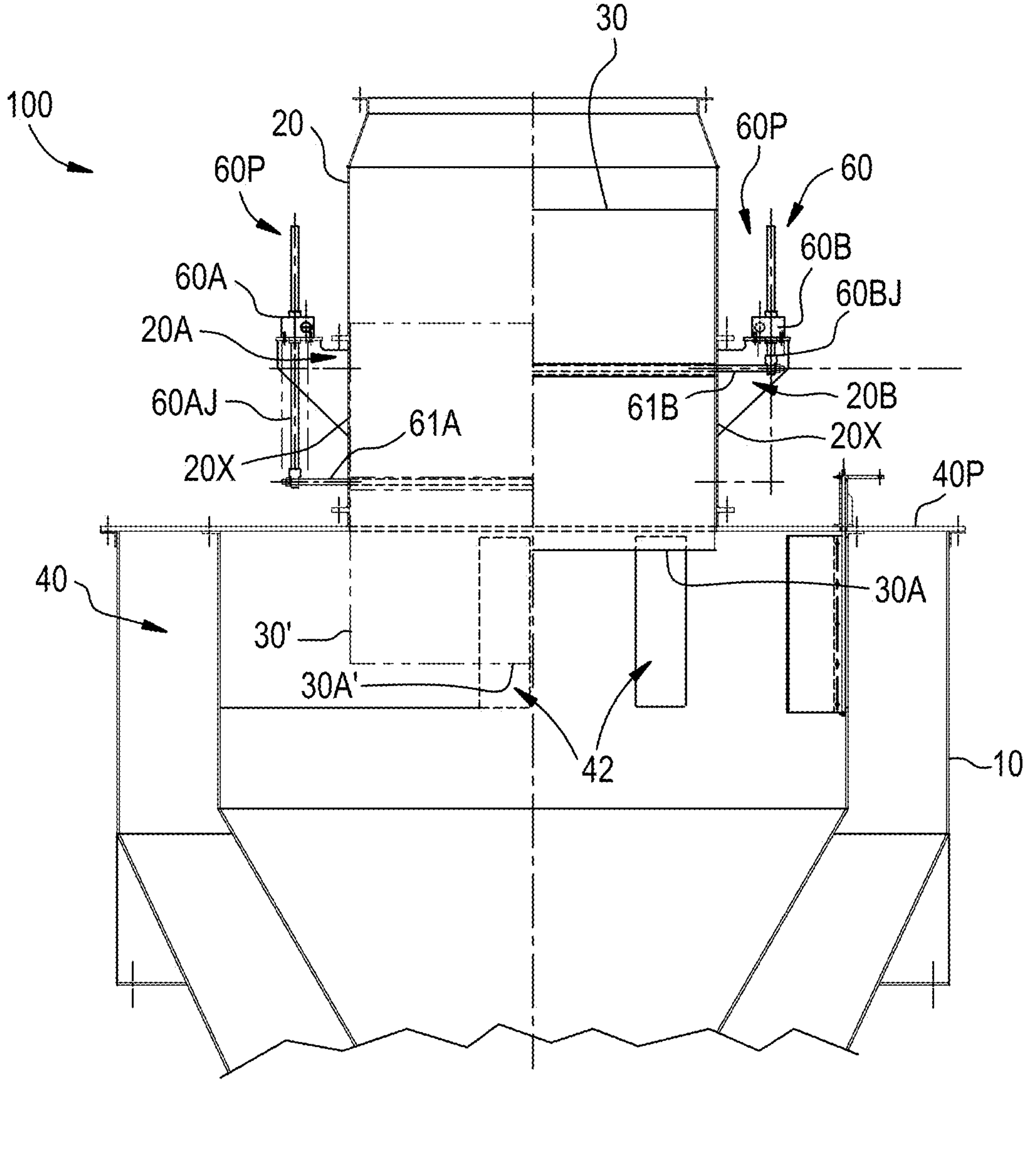
FIG. 11A is a cross sectional view of a portion of the static classifier of a large size classifier shown with two screw jack actuators in communication with the sleeve half of which is shown extended and the other half shown retracted.
Figure 11B:
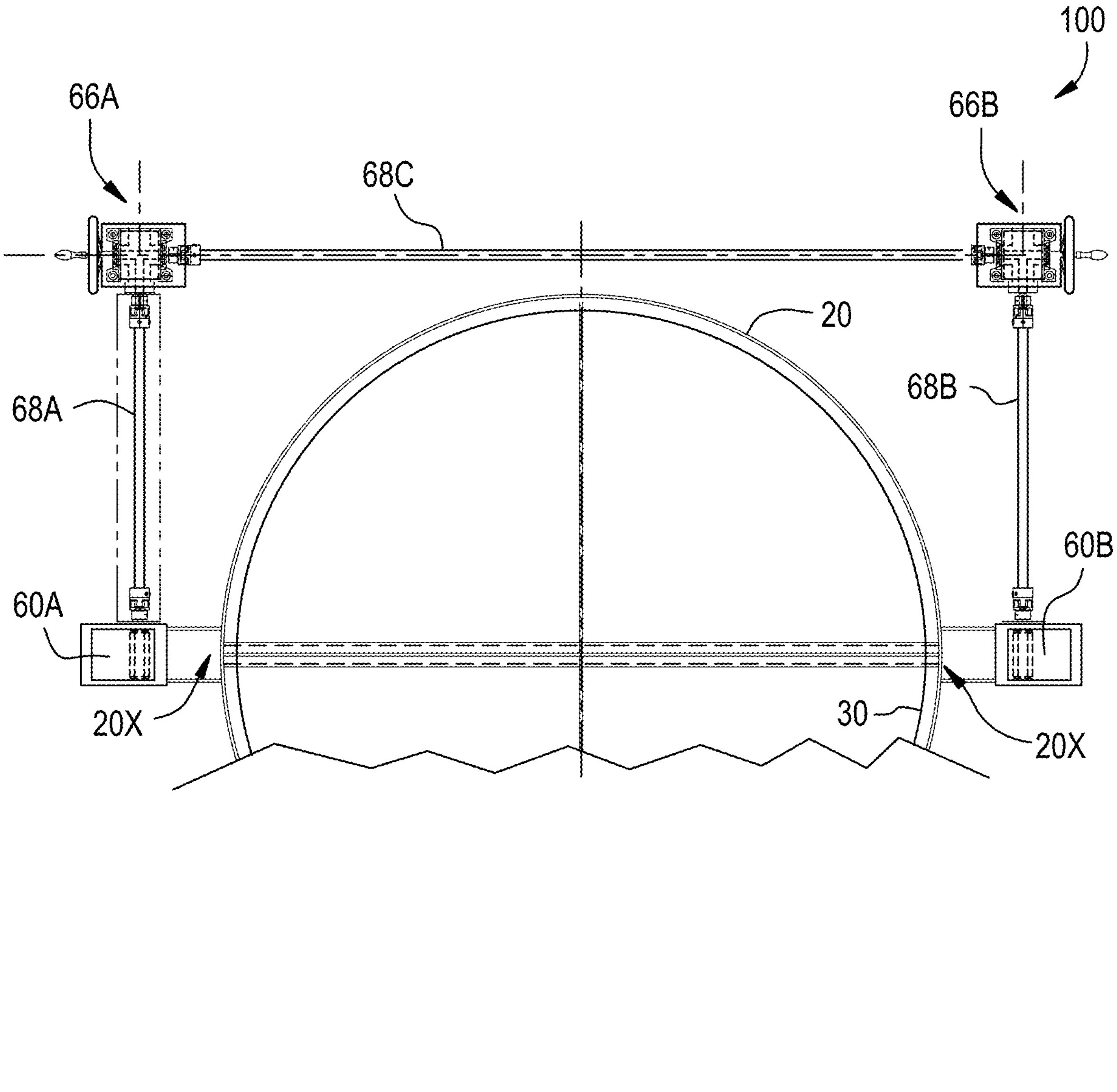
FIG. 11B is a top view of the two screw jacks and static classifier of FIG. 11A.

While FIGS. 1 and 2B show a rack and pinion 60R actuator system 60, the present invention is not limited in this regard as other actuation systems 60 are included in the present invention. For example, as shown in FIG. 11A the actuation system 60 includes to a first actuator 60A and a second actuator 60B. The first actuator 60A is positioned on a first side 20A of the duct 20 and a second actuator 60B positioned on a second side 20B of the duct 20. In some embodiments, the first actuator 60A and the second actuator 60B are screw jacks. As shown in FIG. 11B the first actuator 60A and the second actuator 60B are synchronously coupled to axially move the sleeve 30. The first actuator 60A and the second actuator 60B are synchronously coupled via a driver gear box 66A coupled to the first actuator 60A via a first linkage 68A; a driven gear box 66A coupled to the second actuator 60B via a second linkage 68A; and a third linkage 68C coupling the driver gear box 66A to the driven gear box 66B.

As shown in FIG. 11B, the driver gear box 66A is driven by a hand crank or motor and synchronously rotates the first linkage 68A and the third linkage 68C. The rotation of the third linkage 68C rotates the second linkage 68B via the second gear box 66B. Rotation of the first linkage 68A causes the first actuator 60A to extend or retract a first actuator rod 60AJ arranged therewith. Rotation of the second linkage 68B causes the second actuator 60B to extend or retract a second actuator rod 60BJ arranged therewith. The first actuator rod 60AJ has a first connector arm 61A that extends through the slot 20X slot in the outlet duct 20 and is secured to the sleeve 30. The second actuator rod 60BJ has a second connector arm/rod 61B that extends through the slot 20X in the outlet duct 20 and is extended through the whole diameter of the sleeve 30. Each of the first actuator rod 60AJ and the second actuator rod 60BJ are protected by a respective pipe 60P (see FIG. 11A) which has diameter is slightly larger than the first actuator rod 60AJ and the second actuator rod 60BJ. The first actuator rod 60AJ and the second actuator rod 60BJ move synchronously. For clarity, the left-hand side of FIG. 11A shows the first actuator rod 60AJ extended outwardly from the first actuator 60A thereby extending the distal end 30A' of the sleeve 30' downward to eclipse a portion of the opening 42. The right-hand side of FIG. 11A shows the second actuator rod 60BJ retracted into the second actuator 60B thereby moving the distal end 30A of the sleeve 30 upward thereby uncovering the opening 42.

Figure 12A:
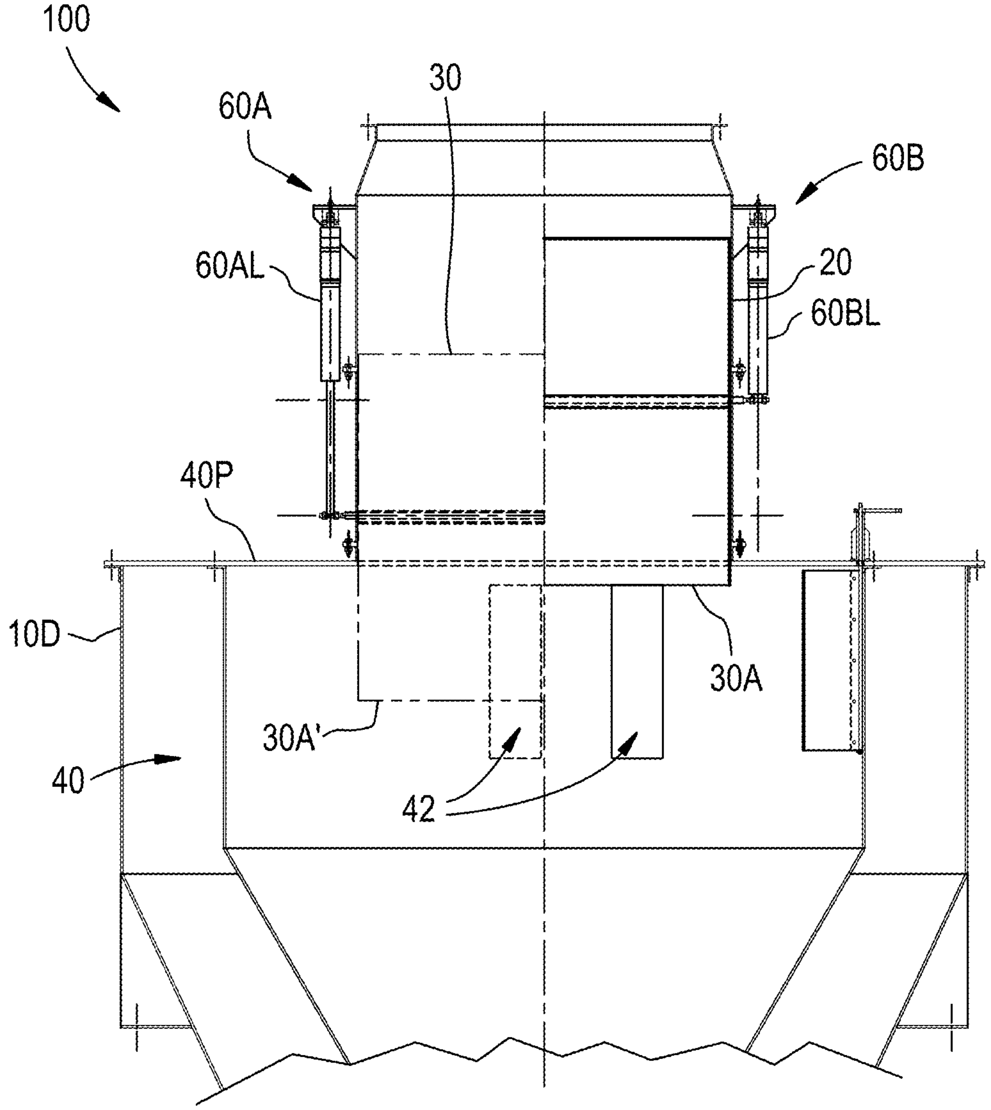
FIG. 12A is a cross sectional view of a portion of the static classifier of a large size classifier shown with two linear actuators in communication with the sleeve.
Figure 12B:
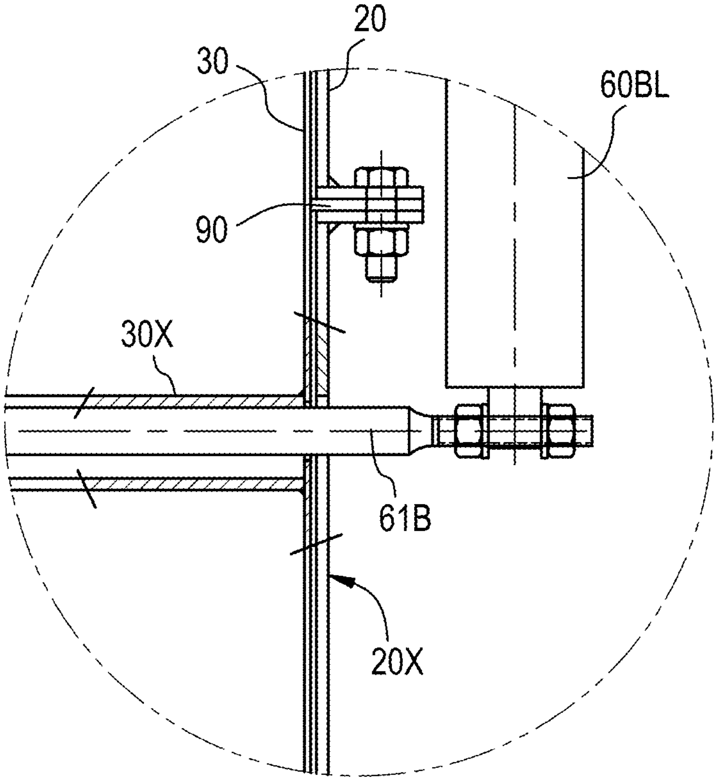
FIG. 12B is an enlarged view of detail 12B of FIG. 12A.

As shown in FIG. 12A, the first actuator 60A is a first linear actuator 60AL and the second actuator 60B is a second linear actuator 60BL. The first linear actuator 60AL and the second linear actuator 60BL are electronically synchronously coupled to one another so as to extend and retract synchronously. As shown in FIG. 2B, the linear actuator 60BL has a connector arm 61B extending there from and communicating with (e.g., extending into) a cross member (e.g., tube) 30X which is secured to the sleeve 30. The cross member 30X extends across the sleeve 30 and is secured to an opposing inside wall of the sleeve 30. The connector arm 61B extends through the cross member 30X and is secured to the first linear actuator 60AL.

Figure 4:
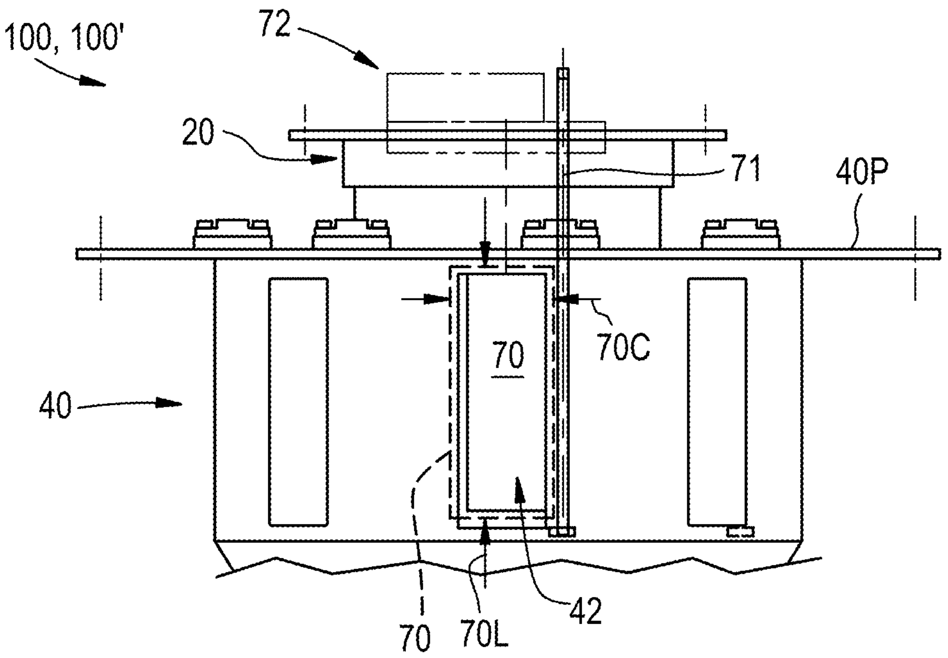
FIG. 4 is a front view of a portion of the static classifier of FIGS. 1 and 14A.
Figure 5:
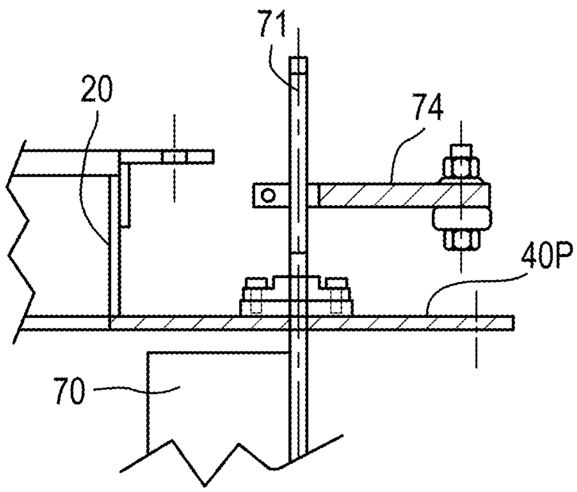
FIG. 5 is an enlarged view of a portion of the static classifier taken across section A-A of FIGS. 3A and 3B.

As shown in FIGS. 4 and 5, the flow restrictor is in the form of a vane 70 (e.g., having an arcuate profile) pivotally mounted (e.g., mounted on a shaft 71) adjacent to the side wall 44 of the classifier chamber 40 proximate each of the plurality of openings 42. The vane 70 has an axial length 70L that is about equal to the axial extent 42A of the opening 42 and the vane 70 has a circumferential arc-length 70C that is about equal to the circumferential extent 42C of the opening 42. The control rod 71 extends out of the classifier chamber 40 and through the top plate 40P. While the first linear actuator 60AL and the second actuator 60B are shown and described more than two actuators (e.g., 3, 4 or more) actuators may be employed.

Figure 3A:
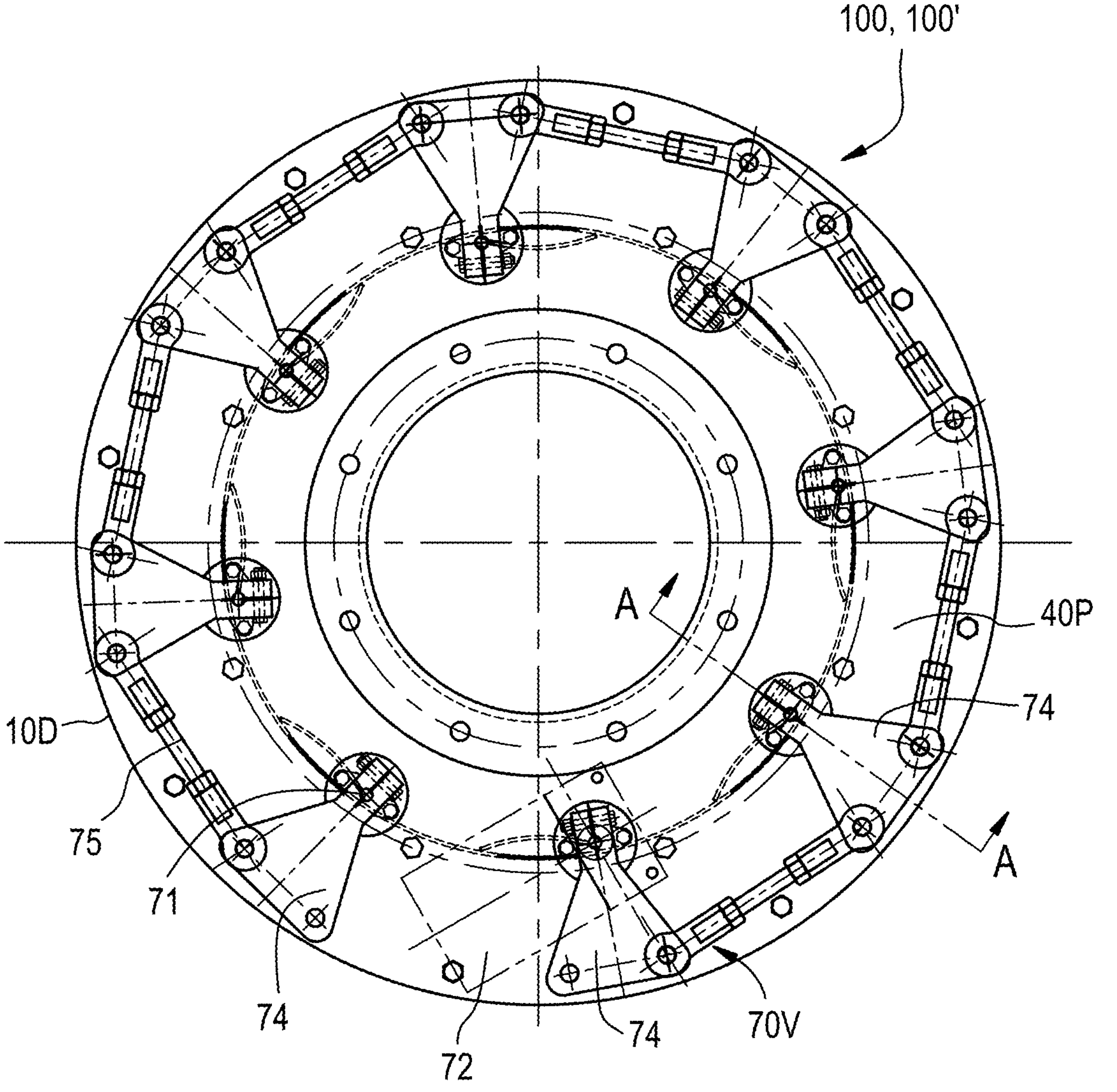
FIG. 3A is a top view of the static classifier of FIGS. 1 and 14A, showing an actuator arrangement.
Figure 3B:
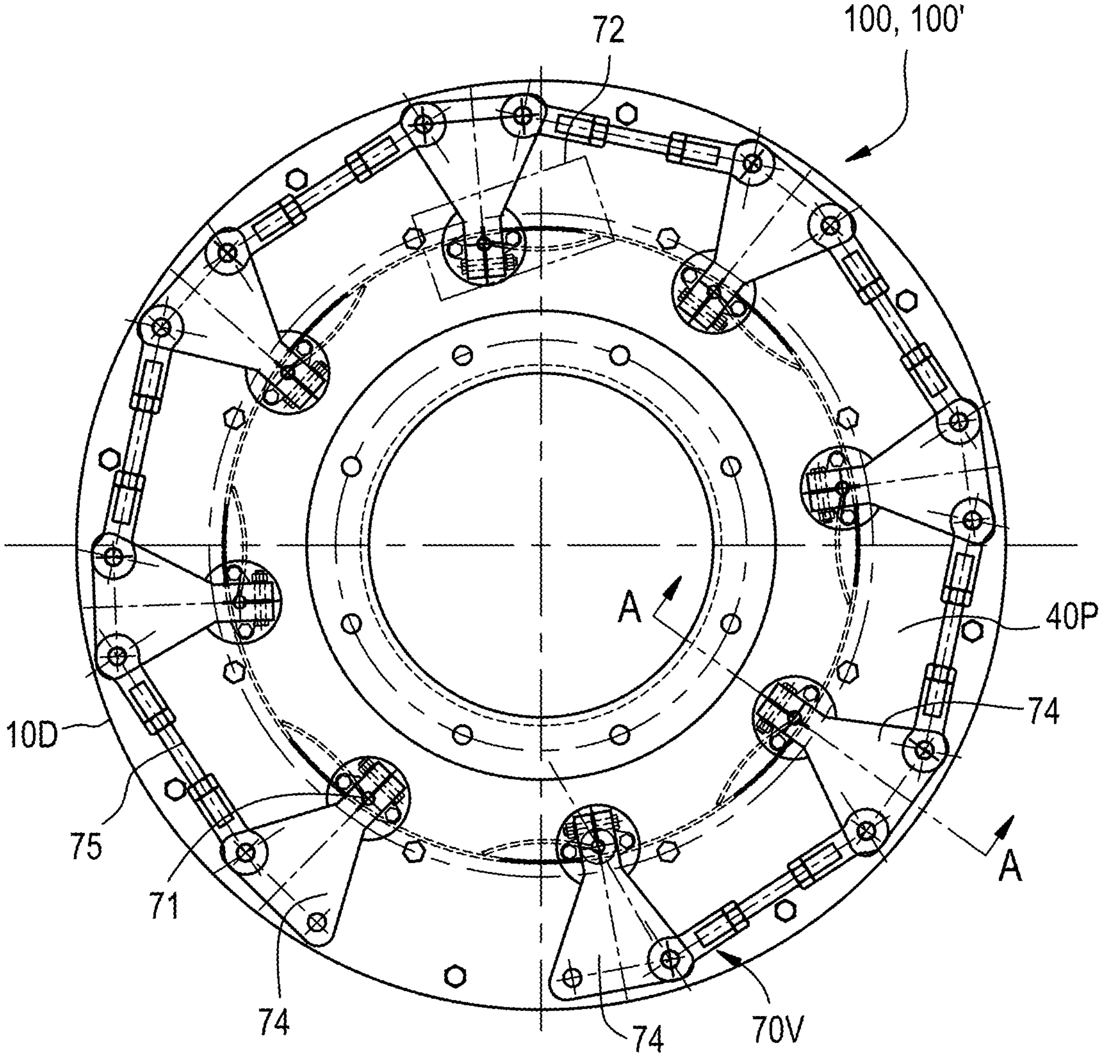
FIG. 3B is a top view of the static classifier of FIGS. 1 and 14A, showing an alternative actuator arrangement.
Figure 10A:
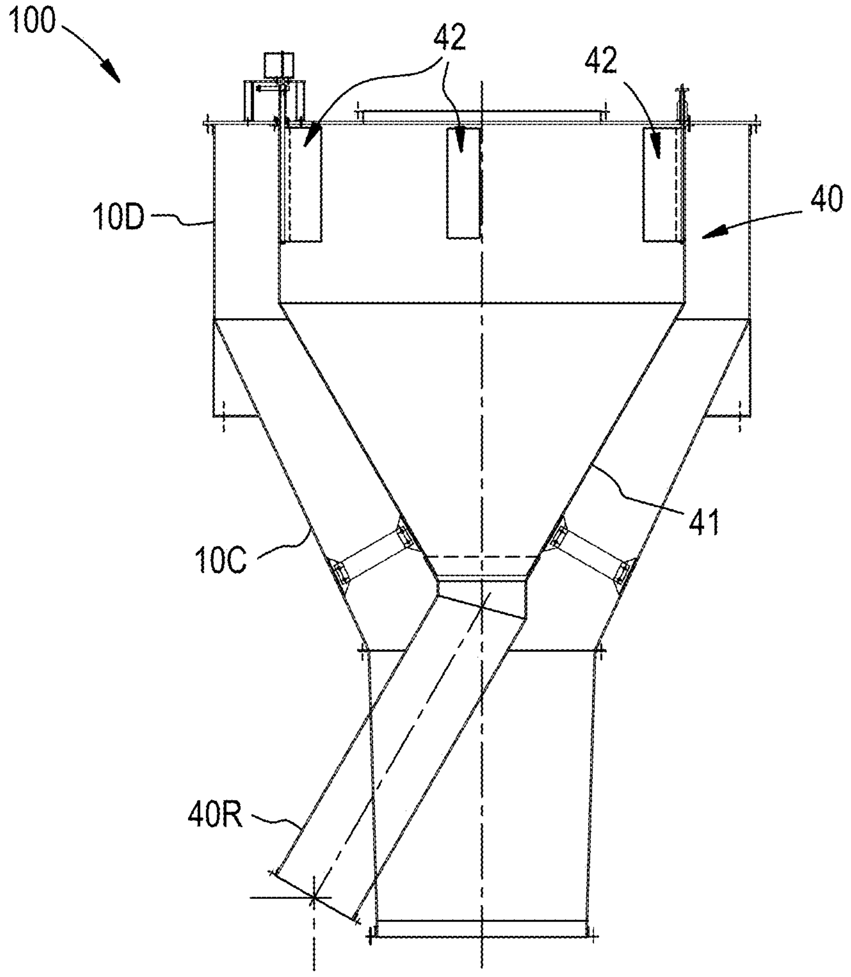
FIG. 10A is a front view of a portion of static classifier similar to that shown in FIG. 1, but of a larger size.
Figure 10B:
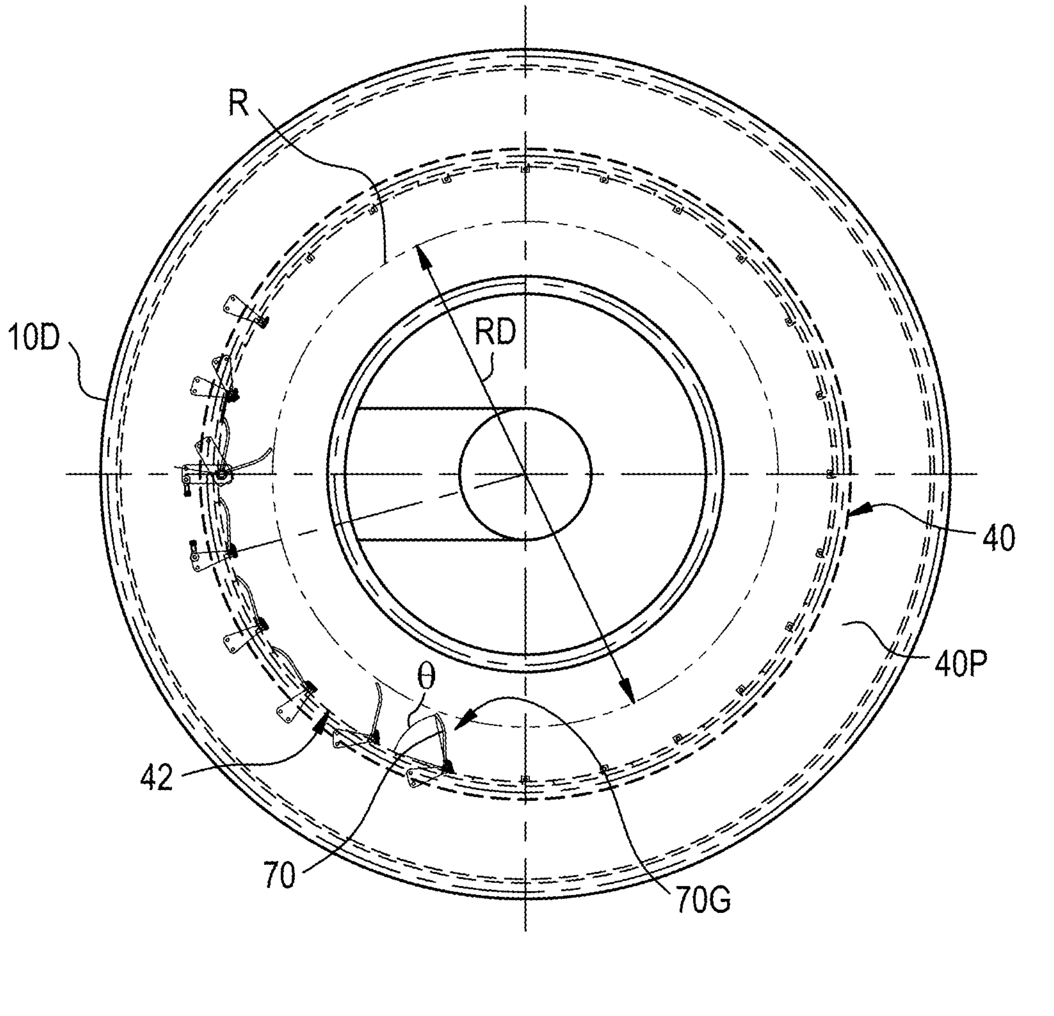
FIG. 10B is a top view of a portion of the static classifier of FIG. 10A shown with the vanes in various pivoted positions.
Figure 10C:
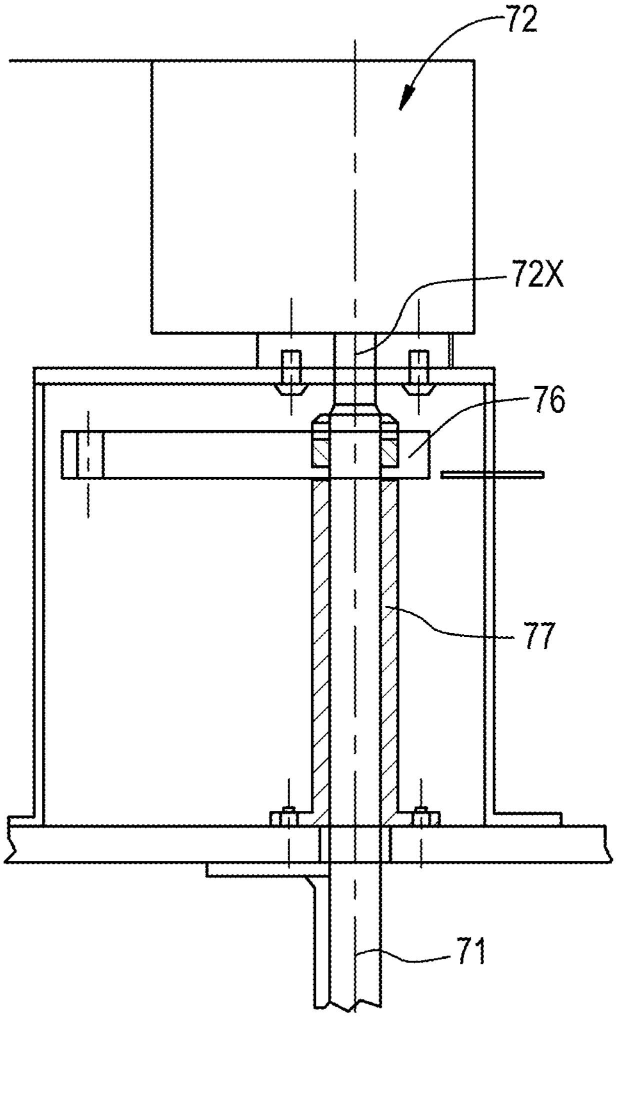
FIG. 10C is an enlarged sectional view of a motor and actuator of one of the vanes of a large size classifier.
Figure 10D:
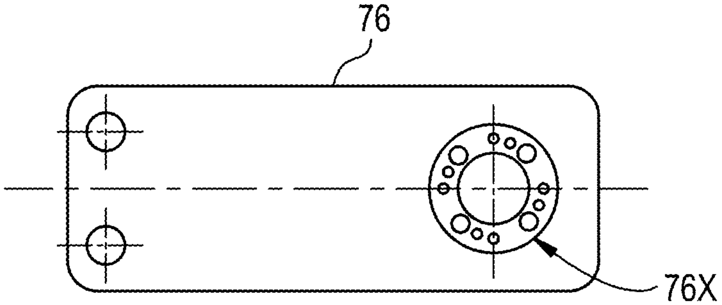
FIG. 10D is a top view of a linkage plate for the actuator of FIG. 10C.
Figure 10E:
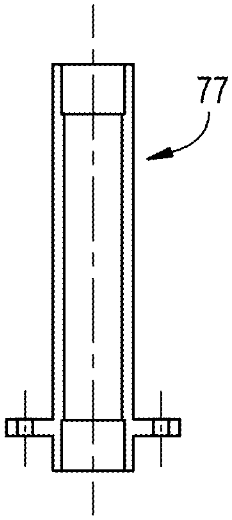
FIG. 10E is a connector tube for the actuator of FIG. 10C.
Figure 10F:
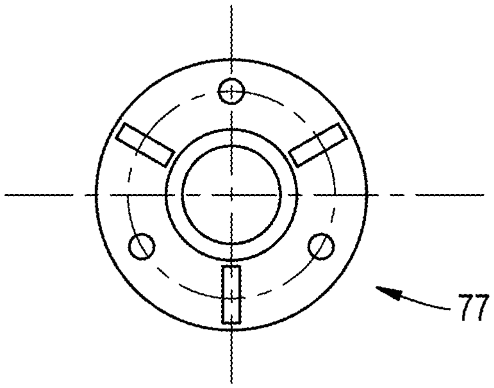
FIG. 10F is a top view of the connector tube of FIG. 10E.

As shown in FIGS. 3A, 10C, and 1D, a vane-actuator system 70V in communication with the vanes 70. The vane-actuator system 70V includes a linkage system which has a connector plate 74 connected to each of the shafts 71 and a linkage rod 75 connecting adjacent connector plates 74. A vane actuator 72 has an actuator shaft 72X that is connected to the one of the shafts 71 via expandable bushing 76X mounted in an actuator lever 76. The connector plate 74 attached to the shaft 71 that has the vane actuator 72 thereon is only connected to one adjacent connector plate 74 by a respective one of the linkage rods 75. As shown in FIG. 3A, the there is no linkage rod 75 between the shaft 71 positioned to the left-hand side of the shaft 71 with the vane actuator 72 thereon. While it is shown in FIG. 3A and described that the connector plate 74 attached to the shaft 71 that has the vane actuator 72 thereon is only connected to one adjacent connector plate 74 by a respective one of the linkage rods 75 and that there is no linkage rod 75 between the shaft 71 positioned to the left-hand side of the shaft 71 with the vane actuator 72 thereon, the present invention is not limited in this regard as the connector plate 74 attached to the shaft 71 that has the vane actuator 72 thereon may be connected to two adjacent connector plates 74 by a respective one each of the linkage rods 75 and there is no linkage rod 75 between a first of the shafts 71 that does not have the vane actuator 72 thereon and a second of the shafts 71 that does not have the vane actuator 72 thereon, as shown in FIG. 3B. The shaft 71 is supported in a mounting sleeve 77 via bearings housed therein. The mounting sleeve 77 is secured to the top plated 40P. The vane actuator 72 is configured to synchronously pivot the vanes 70 relative to the side wall 44 of the classifier chamber 40 to adjust the magnitude of the flow of the particles entrained in the gas through the openings 42. The vane actuator 72 includes a motor or a hand crank. The connector plates 74 are shown for example as being generally triangular. However, in some embodiments the connector plates may have a rectangular shape 76 as show for example in FIG. 10D. The connector plate 75 has utility for use on the shaft 71 that has the vane actuator thereon to provide greater load carrying capability, that the other triangular shaped connector plates 74.

As shown in FIG. 2A, the sleeve 30 has an outside diameter 30D. As shown in FIG. 10B an outer edge 70G of the vanes 70 define a reference circle R which has a reference diameter RD when the vanes 70 extended to a maximum radially inward position. The outside diameter 30D is less than the reference diameter RD, so that the distal end 30A of the sleeve 30 is spaced apart from the vanes 70, when the sleeve 30 extends into the classifier interior area 40D and partially eclipses the axial extent 42A.

Figure 13:
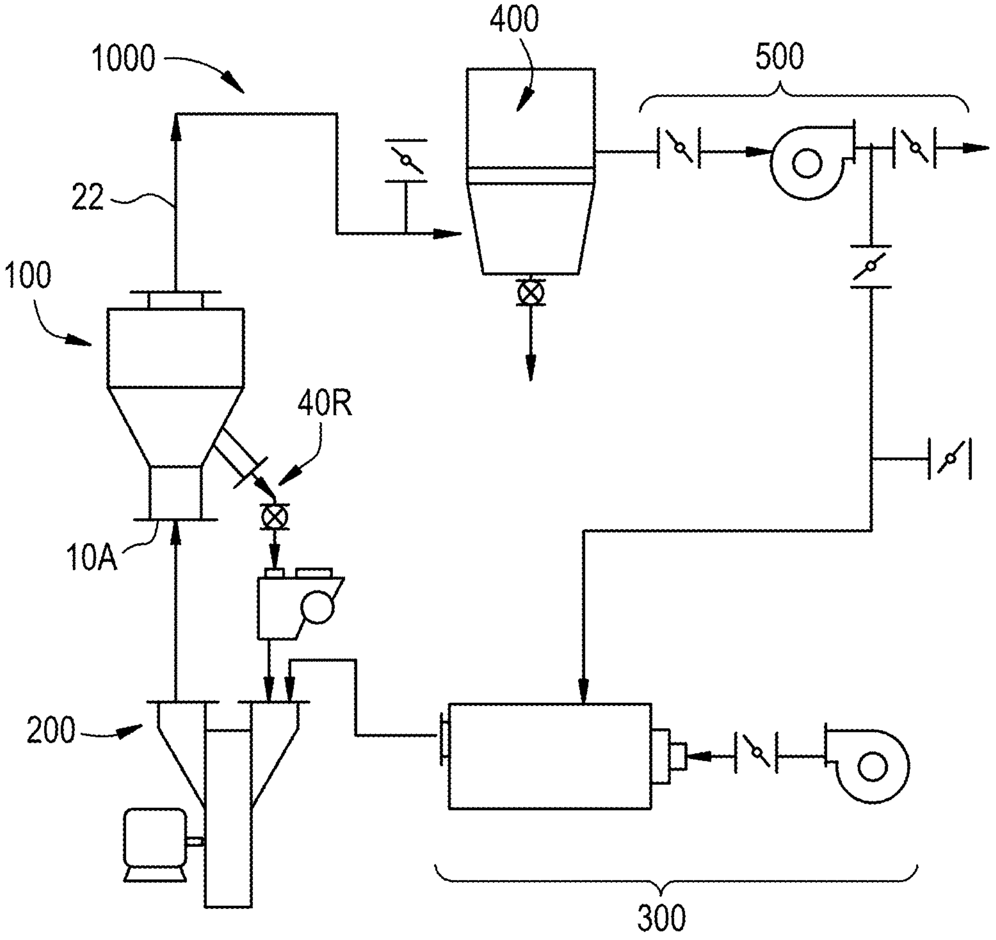
FIG. 13 is a schematic view of the static classifier in a pulverizer system.

The static classifier 100 has utility in pulverizer mill system 1000, as shown in FIG. 13. The pulverizer system 1000 includes a grinding mill 200 (e.g., an impact mill) that feed pulverized particles entrained in a gas to the static classifier 100 via an inlet duct 10A from an upstream blower and air heater system 300. The coarse rejects are classified out in the classifier chamber 40 and returned to the grinding mill 200 via a return duct 40R. The classified fine particles are conveyed to a dust collector 400 with the assistance of a fan system 500.

In some embodiments, the static classifier 100 includes three types of the flow restrictors including the covers 50, the moveable sleeve 30 and the adjustable vanes 70.

In some embodiments, the static classifier 100 includes only two types of the flow restrictors namely, the sleeve 30 and the adjustable vanes 70.

In some embodiments, the static classifier 100 includes only two types of the flow restrictors namely, the covers 50 and the adjustable vanes 70.

Figure 14A:
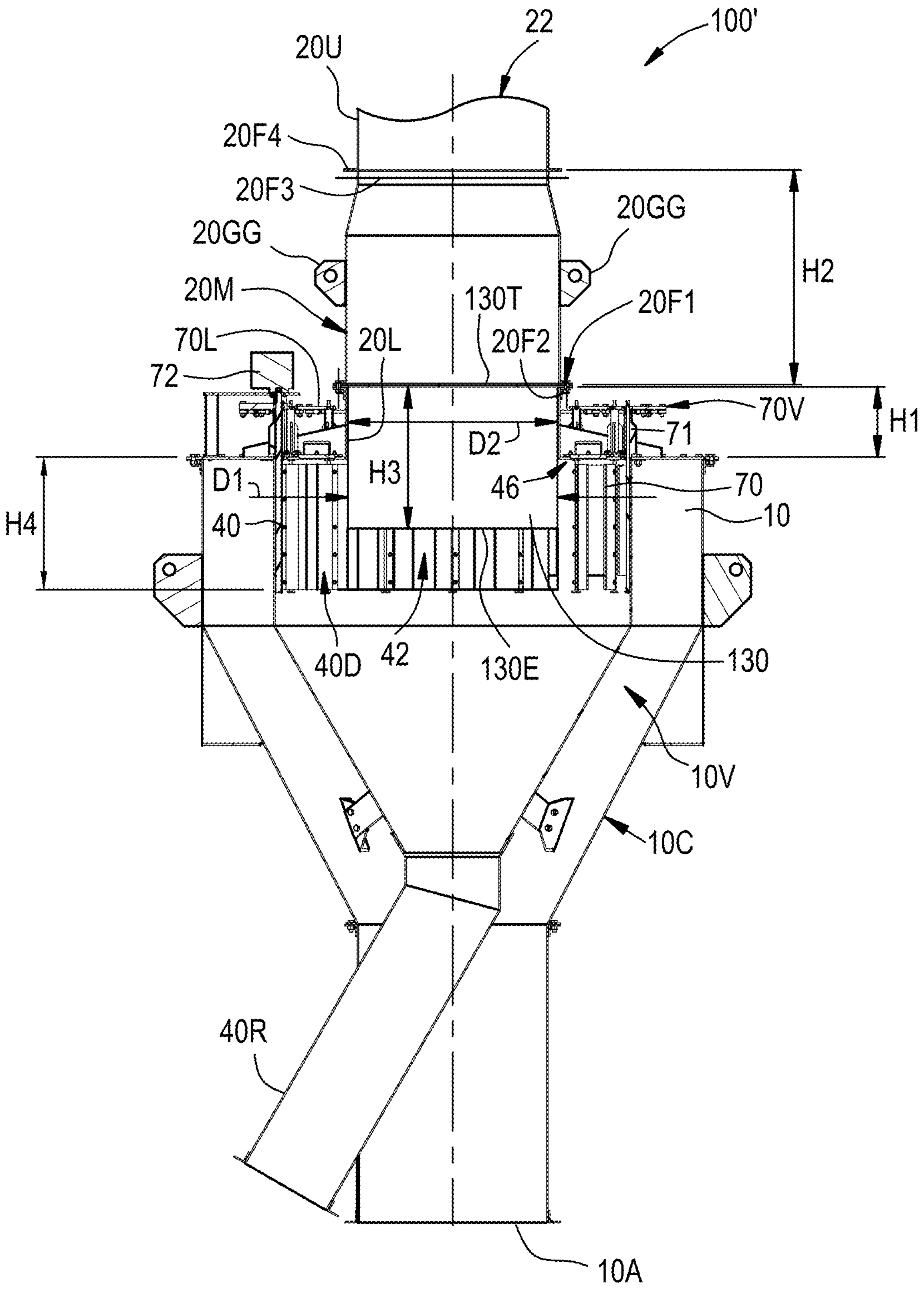
FIG. 14A is a cross sectional view of another embodiment of the static classifier of the present invention and having a removable duct segment and changeable sleeve.
Figure 14B:
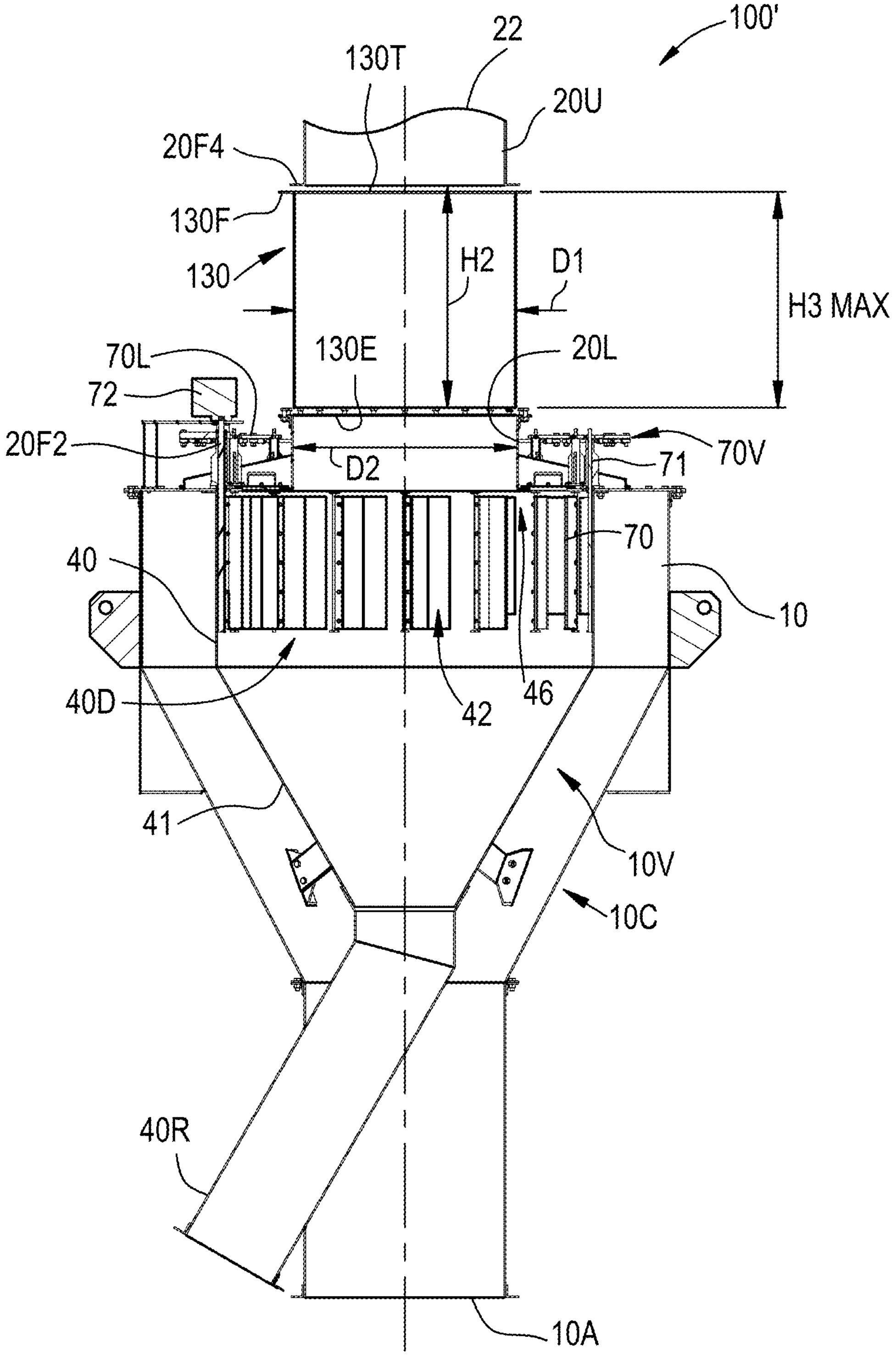
FIG. 14B is a cross sectional view of the static classifier of FIG. 14A, shown with the duct segment removed and the changeable sleeve in an upper position.
Figure 14C:
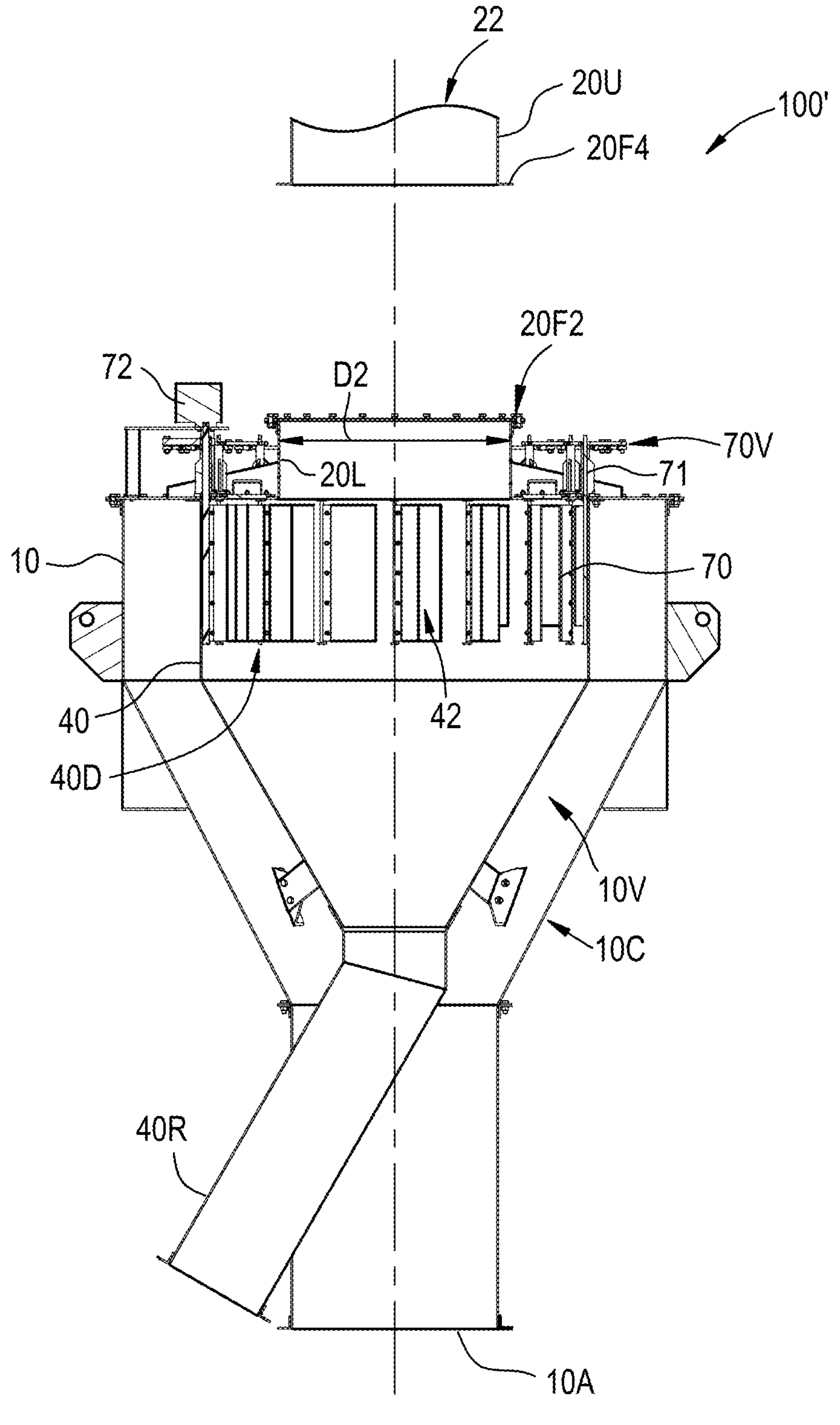
FIG. 14C is a cross sectional view of the static classifier of FIG. 14A, shown with the duct segment removed and the changeable sleeve removed.
Figure 14D:
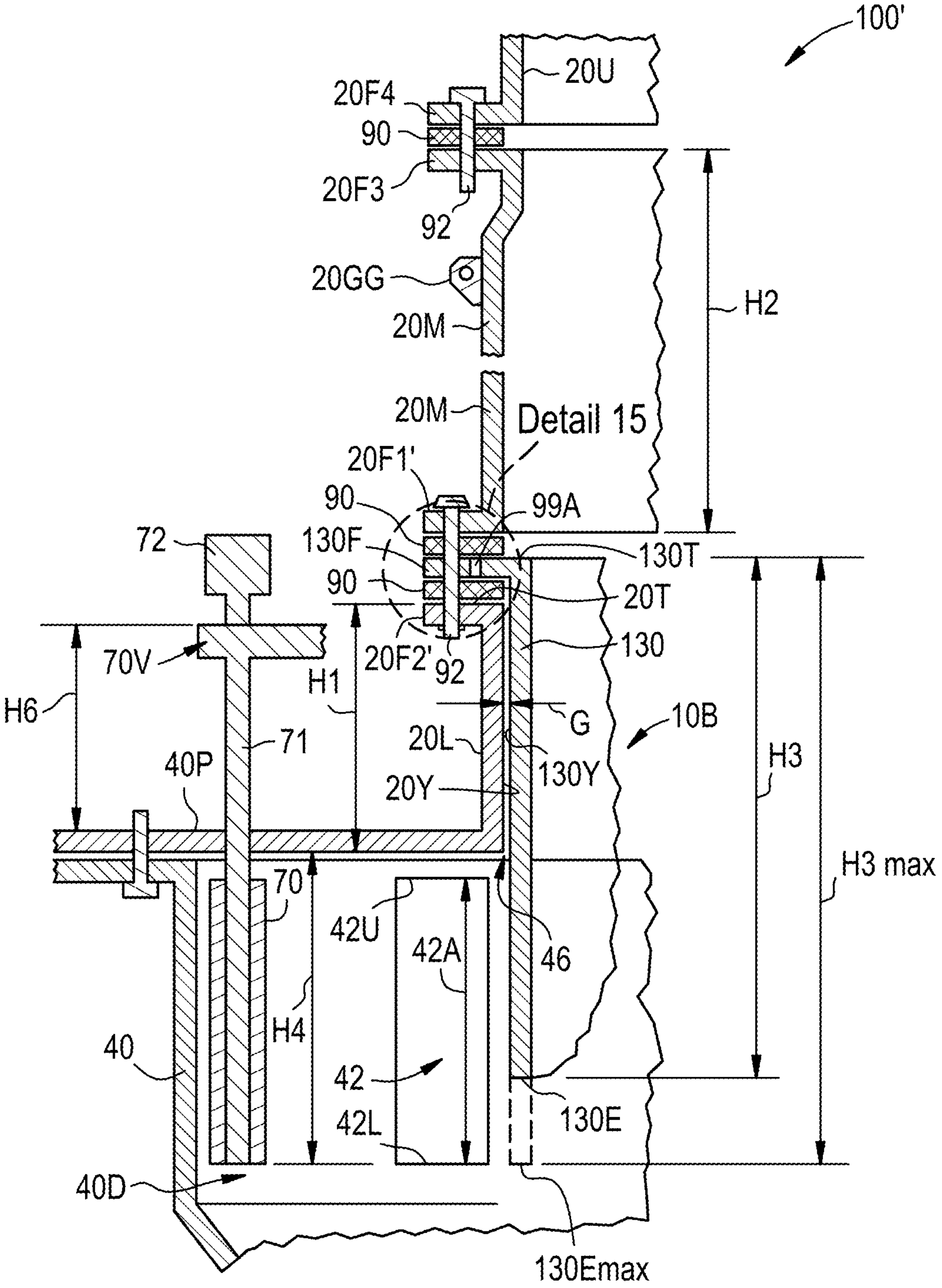
FIG. 14D is an enlarged cross sectional view of a portion of the static classifier of FIG. 14A.

As best shown in FIGS. 14A and 14D, a static classifier is generally designated by the numeral 100'. The static classifier 100' includes a vessel 10 having an inlet 10A and a vessel outlet 10B and having a vessel interior area 10V. The vessel 10 has a top-plate 40P positioned on the vessel outlet 10B and has a classifier outlet 46 formed in the top-plate 40P. An outlet duct 20 is positioned on the classifier outlet 46 and at least an outer-duct portion of the outlet duct extends outwardly from the top-plate 40P. The outer-duct portion includes a lower outer-duct portion 20L, an upper outer-duct portion 20U and a removable outer-duct portion 20M positioned between and removably connected to the lower outer-duct portion 20L and the upper outer-duct portion 20U. The lower outer-duct portion 20L has a first axial length H1, measured between a top portion 20T of a flange 20F2' of the lower outer-duct portion 20L and a bottom portion of the top cover 40P. The removable outer-duct portion 20M has an upper flange 20F3 extending radially outward from a top portion of the removable outer duct portion 20M. The removable outer-duct portion 20M has a lower flange 20F1' extending radially outward from a bottom portion of the removable outer-duct portion 20M. The removable outer-duct portion 20M has a second axial length H2, measured between a bottom portion of the lower flange 20F1' and a top portion of the upper flange 20F3.

Referring to FIG. 14D, the upper outer-duct portion 20U has a lower flange 20F4 extending radially outward from a bottom portion of the upper outer-duct portion 20U. A scal ring 90 is positioned between the lower flange 20F4 of the upper outer-duct portion 20L and the upper flange 20F3 of the removable outer duct portion 20M. A plurality of fasteners 92 extend through and removably connect the lower flange 20F4 to the upper flange 20F3, thereby removably connecting the removable outer-duct portion 20M to the upper outer-duct portion 20U which is fixed in place.

A classifier chamber 40 is positioned in the vessel interior area 10V. The classifier chamber 40 has a plurality of openings 42 that extend through a side wall of the classifier chamber 40 and into a classifier interior area 40D of the classifier chamber 40. The plurality of openings 42 are configured to pass particles entrained in a gas from the vessel interior area 10V into the classifier interior area 40D.

One or more flow restrictors are arranged with the classifier chamber 40. The flow restrictor is configured to establish a flow velocity of the particles entrained in the gas, through the static classifier 100'. In the embodiment shown in FIGS. 14A-14D, the flow restrictor is a changeable sleeve 130 that has a radially outward extending flange 130F that has an upper sleeve end 130T. The sleeve 130 has a generally circular cross section and is circumferentially continuous (e.g., a one piece structure or a structure without any separations or openings extending through a wall of the sleeve). The sleeve 130 also has a lower sleeve end 130E. A third axial length H3 extends between the upper sleeve end 130T and the lower sleeve end 130E. The upper sleeve end 130T is removably secured (i.e., fixed in position, not moveable and not repositionable when the static classifier is assembled and during operation of the static classifier) between the lower outer-duct portion 20L and the removable outer-duct portion 20M. The sleeve 130 is in fixed relation to the classifier chamber 40, not moveable and not repositionable when the static classifier 100' is assembled and during operation of the static classifier. The term changeable, as used herein with respect to the sleeve, refers to the sleeve 130 being configurable, interchangeable, or selectively changeable into various sleeve embodiments that that have different third axial lengths H3 that depend on the type of material processed through the static classifier and the application (e.g., gypsum calcining and gypsum impurity removal) and the extent to which the openings 42 need to be covered. Thus, when the static classifier 100' is offline, the sleeve having one third axial length H3 may be removed from the static classifier 100' and replaced with another sleeve 130 that has a different third axial length H3, to accommodate type of material processed through the static classifier and the application (e.g., gypsum calcining and gypsum impurity removal) and the extent to which the openings 42 need to be covered.

Referring to FIG. 14D, the flange 130F is positioned between the lower flange 20F1' and the flange 20F2'. A seal ring 90 is positioned between the lower flange 20F1' and the flange 130F; and another seal ring 90 is positioned between the flange 130F and the flange 20F2'. A plurality of fasteners 92 extend through and removably connect the lower flange 20F1' and the flange 130F to the flange 20F2', thereby removably connecting the removable outer-duct portion 20M and the sleeve 130 to the lower outer-duct portion 20L which is fixed in place. When the flange 130F is positioned between the lower flange 20F1' and the flange 20F2', the sleeve 130 is in fixed relationship to the classifier chamber 40 and the static classifier 100', and the sleeve 130 is not moveable and not repositionable when the static classifier 100' is assembled and during operation of the static classifier 100'.

Each of the plurality of openings 42 has an axial extent 42A that extends between an upper edge 42U of the respective opening 42 and a lower edge 42L of the respective opening 42 by an axial length which defines the axial extent 42A. The lower edge 42L of the axial extent is located at a fourth axial length H4 measured downward from a bottom portion of the top plate 40P.

The lower sleeve end 130E extends downwardly over at least a portion of the axial extent of each of the openings 42. For example, in some embodiments, the third axial length H3 is a maximum third axial length H3max such that the lower sleeve end 130Emax (shown in dashed lines in FIG. 14D) of the sleeve 130 extends downwardly over the axial extent 42A and the lower edge 42L of the opening 42. In some embodiments, the second axial length H2 is greater than the maximum third axial length H3max, such that second axial length H2 provides an axial clearance for removal of the sleeve 130 from between the lower outer-duct portion 20L and the upper outer-duct portion 20U, when the removable outer-duct portion 20M is removed.

In some embodiments, the maximum third axial length H3max is greater than or equal to the sum of the first axial length H1 and the fourth axial length H4. In some embodiments, the second axial length H2 is greater than or equal to the sum of the first axial length H1 and the fourth axial length H4. In some embodiments, the lower sleeve end 130E extends 2 inches below the upper edge 42U of the respective opening 42. In some embodiments, the lower sleeve end 130E extends up to or below the lower edge 42L of the respective opening 42.

The static classifier 100' is configured to be easily modified when offline to selectively change out the sleeve 130 with those of different third axial lengths H3 to accommodate the classification of different types of material, such as gypsum calcining and gypsum impurity removal. For example, for the gypsum calcining process, the required separation cut size is relatively fine, e.g., 30 microns. However, for the gypsum impurity removal application, the cut size required is much coarser, e.g., 150 microns. The sleeve length requirements are quite different for those two different applications. For example, finer cut sizes utilize longer sleeve lengths than coarser cut sizes which utilize relatively shorter sleeve lengths. For example, the third axial length H3 of the sleeve can be selected from any of the following: (a) the third axial length H3 being greater than the first axial length H1; (b) the third axial length H3 being about equal to the sum of the first axial length H1 and one half of the fourth axial length H4; (c) the third axial length H3 being about equal to a magnitude greater than the first axial length H1 and up to and including the sum of the first axial length H1 and the fourth axial length H4; (d) a first magnitude; and (c) a second magnitude that is greater than the first magnitude.

As shown in FIG. 14A, the sleeve 130 has an outside sleeve diameter D1 and the lower outer-duct portion 20L has an inside duct diameter D2 that is greater than the outside sleeve diameter D1 such that there is a radial gap G extending circumferentially around and between an outer sleeve surface 130Y of the sleeve 130 and an inner duct surface 20Y of the lower outer-duct portion 20L, to accommodate removal of the sleeve 130 from the lower outer-duct portion 20L.

As shown in FIG. 14D, first axial length H1 is greater than a height of structures (e.g., vane-actuator system 70V, including the connector plates 74 and the linkage rods 75) mounted on and extending axially upward from the top plate 40P, to accommodate removal of the sleeve 130 from the lower outer-duct portion 20L. The vane-actuator system 70V including the connector plates 74 and the linkage rods 75 are mounted on and extend axially upward from the top plate 40P by a sixth axial length H6 which is less than the first axial length H1, to accommodate removal of the sleeve 130 from the lower outer-duct portion 20L.

As shown in FIG. 14A, two first grips 20GG (e.g., a handle or a bracket) are secured to a radially outer surface of the outer-duct portion 20M to facilitate removal of the outer-duct portion 20M.

Figure 15A:
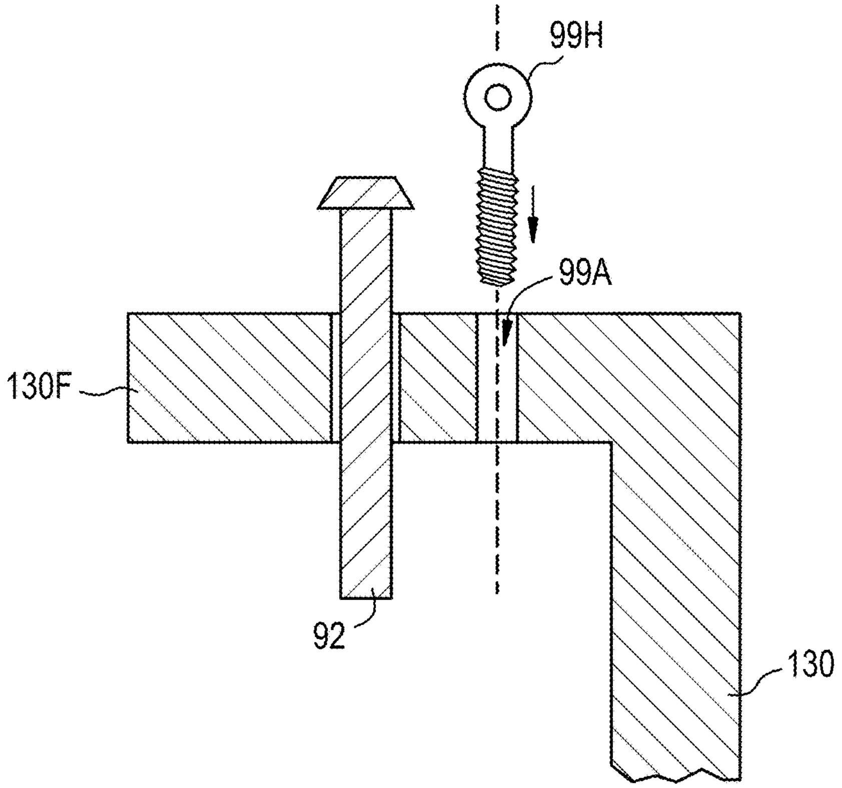
FIG. 15A is an enlarged view of the sleeve flange portion of detail 15 of FIG. 14D showing an axial threaded hole in the sleeve flange in one location.
Figure 15B:
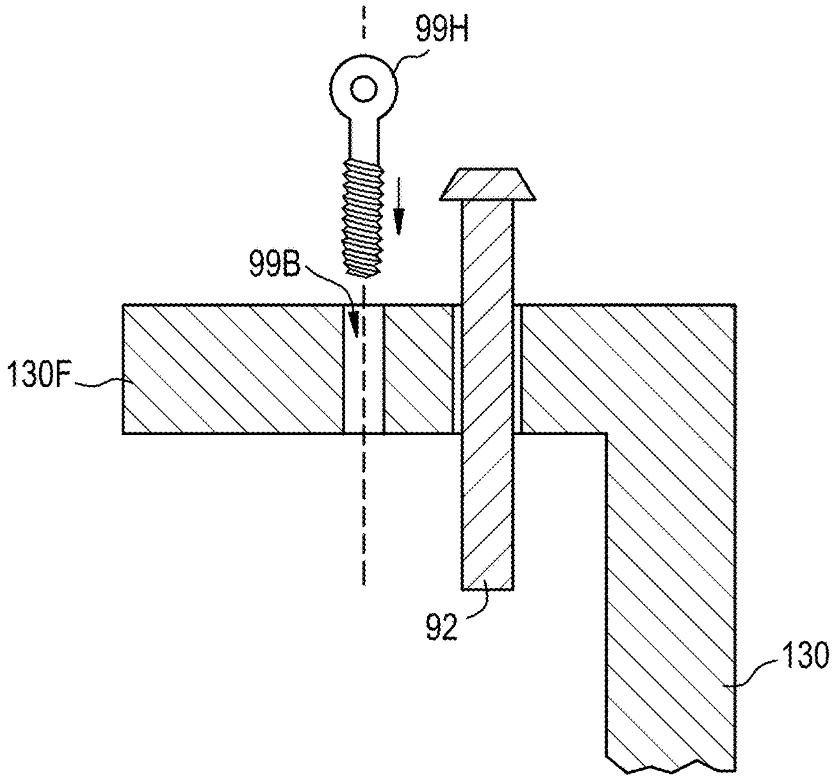
FIG. 15B is an enlarged view of the sleeve flange portion of detail 15 of FIG. 14D, showing an axial threaded hole in the sleeve flange in another location.

As shown in FIG. 15A, there is one or more (preferably two located 180 degrees apart on the flange) receptacles 99A formed in the flange 130F of the sleeve 130 for receiving a second grip 99H (e.g., a threaded eye bolt) to facilitate removal of the sleeve 130. In some embodiments, the receptacle 99A is an axial oriented threaded hole for receiving a threaded eye bolt 99H. In some embodiments, the receptacles 99A are located on the flange 130F, radially inboard of the fasteners 92. However, the present invention is not limited in this regard as the receptacles 99B may be located radially outboard of the fasteners 92, as shown in FIG. 15B.

There is disclosed herein a method for selectively modifying performance of the static classifier 100'. The method includes providing the static classifier 100' that has the third axial length (H3) being selected from any one of the following magnitudes: (a) the third axial length H3 being greater than the first axial length (H1); (b) the third axial length H3 being about equal to the sum of the first axial length (H1) and one half of the fourth axial length (H4); (c) the third axial length H3 being about equal to a magnitude greater than the first axial length H1 and up to and including the sum of the first axial length H1 and the fourth axial length H4; (d) a first magnitude; and (c) a second magnitude that is greater than the first magnitude. The method includes removing the removable outer-duct portion 20M thereby creating a space between the lower outer-duct portion 20L and the upper outer-duct portion 20U. The method also includes raising the sleeve 130 vertically out of the lower outer-duct portion 20L and into the space and moving the sleeve 130 horizontally out of the space. The third axial length (H3) of the A replacement version of the sleeve 130 is determined by selecting one of the following magnitudes: (a) the third axial length H3 being greater than the first axial length H1; (b) the third axial length H3 being about equal to the sum of the first axial length H1 and one half of the fourth axial length H4; (c) the third axial length H3 being about equal to a magnitude between the first axial length H1 and the fourth axial length H4; (d) a first magnitude; and (c) a second magnitude that is greater than the first magnitude. The method further includes moving the replacement version of the sleeve 130 horizontally into the space; lowering the replacement version of the sleeve 130 vertically downward into the lower outer-duct portion 20L; and replacing the removable outer-duct portion 20M into position between the lower outer-duct portion 20L and the upper outer-duct portion 20U.

As shown in FIGS. 3 and 14A, in some embodiments, the static classifier 100' includes a second flow restrictor in the form of one or more vanes 70 pivotally arranged to and located radially inward of the side wall of the classifier chamber 40 proximate each of the plurality of openings 42. The vanes 70 are positioned radially outward of and axially aligned with a portion of the sleeve 130 that partially eclipses the axial extent 42A, and is located between the sleeve 130 and the side wall. Each of the plurality of openings 42 has a circumferential extent and each of the vanes 70 has an axial length equal to the axial extent 42A and a circumferential arc-length equal to the circumferential extent. The vanes 70 have a vane-actuator system 70V that is in communication with the vanes 70 to rotate each of the vanes 70 about a shaft 71. Each of the vanes 70 are pivotally mounted on a respective one of the shafts 71 which extends through the top-plate 40P. The vane-actuator system 70V includes a connector plate 74 connected to each of the shafts 71 and a vane actuator 72 connected to the connector plate 74. The vane actuator 72 is configured to synchronously pivot the vanes 72 relative to the side wall of the classifier chamber 40. In some embodiments, the vane actuator 72 is a lever for manual operation or a motor for electric powered operation of the vanes 70.

As shown in FIG. 6, in some embodiments, the static classifier 100' includes another flow restrictor in the form of one or more covers 50 removably secured over one or more of the plurality of openings 42. Each of the covers 50 are located in the vessel interior area 10V. Each of the plurality of openings 42 has a circumferential extent and a respective one of the covers 42 extends across the circumferential extent and partially across the axial extent 42A of a respective one of the plurality of openings 42.

In some embodiments, the static classifier 100' includes the changeable sleeve 130, one or more of the vanes 70 and one or more of the covers 50, as described herein.

There is disclosed herein a flow restrictor kit configured for individual changeable (e.g., selectively changeable, interchangeable, or configurable) installation and removal of the sleeve 130 in the classifier chamber 40 of the static classifier 100'. The flow restrictor kit includes (a) a first sleeve that has a first upper sleeve end 130T, a first lower sleeve end 130E and a first sleeve third axial length H3 extending between the first upper sleeve end 130T and the first lower sleeve end 130E; and (b) a second sleeve that has a second upper sleeve end 130T, a second lower sleeve end 130E and a second sleeve third axial length H3 extending between the second upper sleeve end 130T and the second lower sleeve end 130E, the second sleeve third axial length being greater than the first sleeve third axial length H3. The first sleeve and the second sleeve are individually (i.e., one sleeve at a time) changeably (e.g., selectively changeable, interchangeable, or configurable) positioned in the classifier chamber 40 with flanges 130F thereof mounted between the lower outer-duct portion 20L and the removable outer-duct portion 20M.

While the static classifier 100' is shown and described as having the sleeves 130 that can have various third axial lengths H3 depending the material and application to selectively cover portions of the opening 42, the present invention is not limited in this regard as other configurations can also be employed, including but not limited to using a sleeve of a standard axial length and selectively adjusting the axial position of the sleeve by securing an upper flange of the sleeve between a modified removable outer-duct portion (e.g., similar to the outer-duct portion 20M) that is made up of two spool pieces (e.g., upper spool piece and a lower spool piece) of predetermined lengths to position the modified sleeve in the classifier chamber 40 to cover a predetermined portion of the openings 42. For example, use of a lower spool piece with a relatively short axial length which positions the sleeve over a larger portion of the openings 42 than the use of a lower spool piece with a relatively long axial length, which positions the sleeve over a lesser portion of the openings 42.

The following clauses that are listed as items represent embodiments of the present invention.

Item 1. A static classifier (100) comprising: a vessel (10) having an inlet (10A) and an outlet (10B) and having a vessel interior area (10V); a classifier chamber (40) positioned in the vessel interior area (10V), the classifier chamber (40) having a plurality of openings (42) extending through a side wall (44) of the classifier chamber (40) and into a classifier interior area (40D) of the classifier chamber (40), the plurality of openings (42) being configured for passing particles entrained in a gas from the vessel interior area (10V) into the classifier interior area (40D); and at least one flow restrictor arranged with the classifier chamber (40); wherein the at least one flow restrictor is configured to establish a flow velocity of the particles entrained in the gas, through the static classifier (100).

Item 2. The static classifier (100) of item 1, wherein the at least one flow restrictor comprises at least one cover (50) removably secured over at least one of the plurality of openings (42).

Item 3. The static classifier (100) of item 2, wherein each of the plurality of openings (42) has an axial extent (42A) and a circumferential extent (42C) and wherein a respective one of the at least one covers (50) extends across the circumferential extent (42C) and partially across the axial extent (42A) of a respective one of the plurality of openings (42).

Item 4. The static classifier (100) of item 1, wherein each of the plurality of openings (42) has an axial extent (42A) and wherein the classifier chamber (40) comprises a classifier outlet (46) connected to an outlet duct (20); and wherein the at least one flow restrictor comprises a sleeve (30) moveably positioned in the outlet duct (20) and a distal end (30A) of the sleeve (30) extending into the classifier interior area (40D) and partially eclipses the axial extent (42A).

Item 5. The static classifier (100) of claim 4, further comprising an actuator system (60) in communication with the sleeve (30), wherein the actuator system (60) is configured to axially position the sleeve (30) relative to the plurality of openings (42).

Item 6. The static classifier (100) of item 5, wherein the actuator system (60) is mounted to an outer portion of the outlet duct (20) and a portion of the actuator system (60) extends through a slot (20X) in the outlet duct (20) and is secured to the sleeve (30).

Item 7. The static classifier (100) of claim 6, further comprising a first seal (80) having a portion thereof radially positioned between the sleeve (30) and the outlet duct (20) and axially located below the slot (20X) and a second seal (90) having a portion thereof radially positioned between the sleeve (30) and the outlet duct (20) and axially located above the slot (20X).

Item 8. The static classifier (100) of item 5, wherein the actuator system (60) comprises a rack and pinion device (60R).

Item 9. The static classifier (100) of item 5, wherein the actuator system (60) comprises a first actuator (60A) positioned on a first side (20A) of the duct (20) and a second actuator (60B) positioned on a second side (20B) of the duct (20), wherein the first actuator (60A) and the second actuator (60B) are synchronously coupled to axially move the sleeve (30).

Item 10. The static classifier (100) of item 9, wherein the first actuator (60A) comprises a first screw jack and the second actuator (60B) comprises a second screw jack and wherein the synchronously coupling comprises: (i) a driver gear box (66A) coupled to the first screw jack (60AJ) via a first linkage (68A); (ii) a driven gear box (66A) coupled to the second screw jack (60BJ) via a second linkage (68A); and (iii) a third linkage (68C) coupling the driver gear box (66A) to the driven gear box (66B).

Item 11. The static classifier (100) of item 5, wherein the first actuator (60A) comprises a first linear actuator (60AL) and the second actuator (60B) comprises a second linear actuator (60BL) and wherein first linear actuator (60AL) and the second linear actuator (60BL) are synchronously coupled and wherein the synchronously coupling is electronic.

Item 12. The static classifier (100) of item 1, wherein the at least one flow restrictor comprises a vane (70) pivotally arranged to the side wall (44) of the classifier chamber (40) proximate each of the plurality of openings (42).

Item 13. The static classifier (100) of item 12, wherein each of the plurality of openings (42) has an axial extent (42A) and a circumferential extent (42C) and wherein the vane (70) has an axial length (70L) about equal to the axial extent (42A) and a circumferential arc-length (70C) about equal to the circumferential extent (42C).

Item 14. The static classifier (100) of item 12, further comprising vane-actuator system (70V) in communication with the vanes (70).

Item 15. The static classifier (100) of item 14, wherein the classifier chamber (40) has a top-plate (40P) secured thereto, each of the vanes (70) being pivotally mounted on a shaft (77) which extends through the top-plate (40P), the vane-actuator system (70V) comprises connector plate 74 connected to each of the shafts (77) and a vane actuator (72) connected to the connector plate 72, the vane actuator (72) being configured to synchronously pivot the vanes (70) relative to the side wall (44) of the classifier chamber (40).

Item 16. The static classifier (100) of item 15, wherein the vane actuator (72) comprises a lever for manual operation or a motor for electric powered operation of the vane actuator.

Item 17. A static classifier (100) of item, comprising: (a) at least one cover (50) of item 2 and optionally item 3 removably secured over at least one of the plurality of openings (42); (b) a sleeve (30) of item 4 and optionally any of items 5-11 and wherein each of the plurality of openings (42) has an axial extent (42A) and wherein the classifier chamber (40) comprises a classifier outlet (46) connected to an outlet duct (20); and the sleeve (30) is moveably positioned in the outlet duct (20) and a distal end (30A) of the sleeve (30) extends into the classifier interior area (40D) and partially eclipses the axial extent (42A); and (c) a vane (70) of item 12 and optionally any of items 13-16 pivotally arranged to the side wall (44) of the classifier chamber (40) proximate each of the plurality of openings (42).

Item 18. The static classifier (100) of item 17, wherein the sleeve (30) has an outside diameter (30D) and an outer edge (70G) of the vanes (70) define a reference circle (R) which has a reference diameter (RD) when the vanes (70) extended to a maximum radially inward position and the outside diameter (30D) is less than the reference diameter, so that the distal end (30A) of the sleeve (30) is spaced apart from the vanes (70), when the sleeve (30) extends into the classifier interior area (40D) and partially eclipses the axial extent (42A).

Item 19. A static classifier (100) of item 1, comprising: (a) a sleeve (30) of item 4 and optionally any of items 5-11 and wherein each of the plurality of openings (42) has an axial extent (42A) and wherein the classifier chamber (40) comprises a classifier outlet (46) connected to an outlet duct (20); and the sleeve (30) is moveably positioned in the outlet duct (20) and a distal end (30A) of the sleeve (30) extends into the classifier interior area (40D) and partially eclipses the axial extent (42A); and (b) a vane (70) of item 12 and optionally any of items 13-16 pivotally arranged to the side wall (44) of the classifier chamber (40) proximate each of the plurality of openings (42).

Item 20. The static classifier (100) of item 19, wherein the sleeve (30) has an outside diameter (30D) and an outer edge (70G) of the vanes (70) define a reference circle (R) which has a reference diameter (RD) when the vanes (70) extended to a maximum radially inward position and the outside diameter (30D) is less than the reference diameter, so that the distal end (30A) of the sleeve (30) is spaced apart from the vanes (70), when the sleeve (30) extends into the classifier interior area (40D) and partially eclipses the axial extent (42A).

Item 21. A static classifier (100) of item 1, comprising: (a) at least one cover (50) of item 2 and optionally item 3 removably secured over at least one of the plurality of openings (42); and (b) a vane (70) of item 12 and optionally any of items 13-16 pivotally arranged to the side wall (44) of the classifier chamber (40) proximate each of the plurality of openings (42).

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of the appended claims.

What is claimed is:

1. A static classifier comprising:

a vessel having an inlet and a vessel outlet and having a vessel interior area, the vessel having a top-plate positioned on the vessel outlet and having a classifier outlet formed in the top-plate, and an outlet duct positioned on the classifier outlet and at least an outer-duct portion of the outlet duct extending outwardly from the top-plate;

a classifier chamber positioned in the vessel interior area, the classifier chamber having a plurality of openings extending through a side wall of the classifier chamber and into a classifier interior area of the classifier chamber, the plurality of openings being configured for passing particles entrained in a gas from the vessel interior area into the classifier interior area; and at least one flow restrictor arranged with the classifier chamber;

the at least one flow restrictor is configured to establish a flow velocity of the particles entrained in the gas, through the static classifier;

wherein each of the plurality of openings has an axial extent; and wherein the at least one flow restrictor comprises a sleeve moveably positioned in the outer-duct portion of the of the outlet duct and a distal end of the sleeve being movably extendable into the classifier interior area and at least partially eclipses the axial extent;

an actuator system in communication with the sleeve, wherein the actuator system is configured to axially position the sleeve relative to the plurality of openings;

wherein the actuator system comprises a first actuator positioned on a first outer circumferential side of the outer-duct portion of the outlet duct and a second actuator positioned on a second outer circumferential side of the outer-duct portion of the outlet duct, wherein the first actuator and the second actuator are synchronously coupled to axially move the sleeve; and wherein the first actuator comprises a first screw jack and the second actuator comprises a second screw jack and wherein the synchronously coupling comprises:

(i) a driver gear box coupled to the first screw jack via a first linkage;

(ii) a driven gear box coupled to the second screw jack via a second linkage; and (iii) a third linkage coupling the driver gear box to the driven gear box.

2. The static classifier of claim 1, wherein the actuator system is mounted to an outer circumferential side of the outer-duct portion of the outlet duct and a portion of the actuator system extends through a slot in the outer-duct portion of the outlet duct and is secured to a portion of the sleeve located in the outer-duct portion of the outlet duct.

3. The static classifier of claim 2, further comprising a first seal having a portion thereof positioned between the sleeve and the outlet duct and located below the slot and a second seal having a portion thereof positioned between the sleeve and the outlet duct and located above the slot, wherein the sleeve is in axial sliding engagement with the first seal and the second seal in response to the actuator system axially positioning the sleeve relative to the plurality of openings.

4. The static classifier of claim 1, wherein the actuator system comprises a rack and pinion device.

5. The static classifier of claim 1, wherein the first actuator comprises a first linear actuator and the second actuator comprises a second linear actuator and wherein the first linear actuator and the second linear actuator are synchronously coupled and wherein the synchronously coupling is electronic.

6. The static classifier of claim 1, further comprising a second flow restrictor comprising a vane pivotally arranged to and located radially inward of the side wall of the classifier chamber proximate each of the plurality of openings, wherein the vane is positioned radially outward of and axially aligned with an axial path of travel of a portion of the sleeve that partially eclipses the axial extent, and is located between the sleeve and the side wall.

7. The static classifier of claim 6, wherein each of the plurality of openings has an axial extent and a circumferential extent and wherein the vane has an axial length equal to the axial extent and a circumferential arc-length equal to the circumferential extent.

8. The static classifier of claim 6, further comprising a vane-actuator system in communication with the vanes.

9. A static classifier comprising:

a vessel having an inlet and a vessel outlet and having a vessel interior area, the vessel having a top-plate positioned on the vessel outlet and having a classifier outlet formed in the top-plate, and an outlet duct positioned on the classifier outlet and at least an outer-duct portion of the outlet duct extending outwardly from the top-plate;

the outer-duct portion comprising a lower outer-duct portion, an upper outer-duct portion and a removable outer-duct portion positioned between and removably connected to the lower outer-duct portion and the upper outer-duct portion;

the lower outer-duct portion having a first axial length and the removable outer-duct portion having a second axial length;

a classifier chamber positioned in the vessel interior area, the classifier chamber having a plurality of openings extending through a side wall of the classifier chamber and into a classifier interior area of the classifier chamber, the plurality of openings being configured for passing particles entrained in a gas from the vessel interior area into the classifier interior area; and at least one flow restrictor arranged with the classifier chamber;

the at least one flow restrictor is configured to establish a flow velocity of the particles entrained in the gas, through the static classifier;

wherein the at least one flow restrictor comprises a sleeve having an upper sleeve end, a lower sleeve end and a third axial length extending between the upper sleeve end and the lower sleeve end, the upper sleeve end being removably secured between and in fixed relation to the lower outer-duct portion and the removable outer-duct portion;

wherein each of the plurality of openings has an axial extent extending between an upper edge of the opening and a lower edge of the opening, and the lower edge of the axial extent is located at a fourth axial length measured downward from the top plate;

wherein the lower sleeve end extends downwardly over at least a portion of the axial extent.

10. The static classifier of claim 9, wherein the third axial length is a maximum third axial length such that the lower sleeve end extends downwardly over the axial extent and the lower edge of the opening.

11. The static classifier of claim 10, wherein the second axial length is greater than the maximum third axial length, such that second axial length provides an axial clearance for removal of the sleeve between the lower outer-duct portion and the upper outer-duct portion, when the removable outer-duct portion is removed.

12. The static classifier of claim 10, wherein the maximum third axial length is greater than or equal to the sum of the first axial length and the fourth axial length.

13. The static classifier of claim 10, wherein the second axial length is greater than or equal to the sum of the first axial length and the fourth axial length.

14. The static classifier of claim 9, wherein the third axial length is of a magnitude of one of:

(a) a first magnitude or a second magnitude that is greater that the first magnitude;
(b) equal to the sum of the first axial length and one half of the fourth axial length; and
(c) greater than the first axial length and up to and including the sum of the first axial length and the fourth axial length.

15. The static classifier of claim 9, wherein the sleeve has an outside sleeve diameter and the lower outer-duct portion has an inside duct diameter that is greater than the outside sleeve diameter such that there is a radial gap between an outer sleeve surface of the sleeve and an inner duct surface of the lower outer-duct portion, to accommodate removal of the sleeve from the lower outer-duct portion.

16. The static classifier of claim 9, further comprising at least one first grip secured to a radially outer surface of the removable outer-duct portion to facilitate removal of the removable outer-duct portion.

17. The static classifier of claim 9, further comprising at least one receptacle formed in a flange of a sleeve for receiving a second grip to facilitate removal of the sleeve.

18. The static classifier of claim 9, wherein the first axial length is greater than a height of a structure mounted on and extending axially upward from the top plate, to accommodate removal of the sleeve from the lower outer-duct portion.

19. The static classifier of claim 18, wherein the structure is a vane actuator assembly.

20. A method for selectively modifying performance of a static classifier, the method comprising:

providing the static classifier of claim 9, wherein the third axial length is one of a first magnitude or a second magnitude that is greater than the first magnitude;
removing the removable outer-duct portion thereby creating a space between the lower outer-duct portion and the upper outer-duct portion;
raising the sleeve vertically out of the lower outer-duct portion and into the space;
moving the sleeve horizontally out of the space;
selecting a replacement version of the sleeve, wherein the third axial length is another of the first magnitude or the second magnitude;
moving the replacement version of the sleeve horizontally into the space;
lowering the replacement version of the sleeve vertically downward into the lower outer-duct portion; and
replacing the removable outer-duct portion into position between the upper outer-duct portion and the lower outer-duct portion.

21. The static classifier of claim 9, further comprising a second flow restrictor comprising a vane pivotally arranged to and located radially inward of the side wall of the classifier chamber proximate each of the plurality of openings, wherein the vane is positioned radially outward of and axially aligned with a portion of the sleeve that partially eclipses the axial extent, and is located between the sleeve and the side wall.

22. The static classifier of claim 21, wherein each of the plurality of openings has a circumferential extent and wherein the vane has an axial length equal to the axial extent and a circumferential arc-length equal to the circumferential extent.

23. The static classifier of claim 21, further comprising vane-actuator system in communication with the vanes.

24. The static classifier of claim 23, wherein each of the vanes are pivotally mounted on a shaft which extends through the top-plate, the vane-actuator system comprises a linkage system connected to each of the shafts and a vane actuator connected to the linkage system, the vane actuator being configured to synchronously pivot the vanes relative to the side wall of the classifier chamber.

25. The static classifier of claim 23, wherein the vane actuator comprises a lever for manual operation or a motor for electric powered operation of the vanes.

26. The static classifier of claim 21, further comprising a third flow restrictor comprising at least one cover removably secured over at least one of the plurality of openings, the at least one cover being located in the vessel interior area.

27. The static classifier of claim 26, wherein each of the plurality of openings has a circumferential extent and wherein a respective one of the at least one covers extends across the circumferential extent and partially across the axial extent of at least one of the plurality of openings.

28. The static classifier of claim 9, further comprising a second flow restrictor comprising at least one cover removably secured over at least one of the plurality of openings, the at least one cover being located in the vessel interior area.

29. The static classifier of claim 28, wherein each of the plurality of openings has a circumferential extent and wherein a respective one of the at least one covers extends across the circumferential extent and partially across the axial extent of at least one of the plurality of openings.

30. A static classifier comprising:

a vessel having an inlet and a vessel outlet and having a vessel interior area, the vessel having a top-plate positioned on the vessel outlet and having a classifier outlet formed in the top-plate, and an outlet duct positioned on the classifier outlet and at least an outer-duct portion of the outlet duct extending outwardly from the top-plate;
the outer-duct portion comprising a lower outer-duct portion, an upper outer-duct portion and a removable outer-duct portion positioned between and removably connected to the lower outer-duct portion and the upper outer-duct portion;
the lower outer-duct portion having a first axial length and the removable outer-duct portion having a second axial length;
a classifier chamber positioned in the vessel interior area, the classifier chamber having a plurality of openings extending through a side wall of the classifier chamber and into a classifier interior area of the classifier chamber, the plurality of openings being configured for passing particles entrained in a gas from the vessel interior area into the classifier interior area;
wherein each of the plurality of openings has an axial extent extending between an upper edge of the opening and a lower edge of the opening, and the lower edge of the axial extent is located at a fourth axial length measured downward from the top plate;
a flow restrictor kit comprising:
(a) a first sleeve having a first upper sleeve end, a first lower sleeve end and a first sleeve third axial length extending between the first upper sleeve end and the first lower sleeve end; and
(b) a second sleeve having a second upper sleeve end, a second lower sleeve end and a second sleeve third axial length extending between the second upper sleeve end and the second lower sleeve end, the second sleeve third axial length being greater than the first sleeve third axial length;

the first sleeve and the second sleeve being individually changeably positionable in the classifier chamber.

* * * * *